(12) United States Patent
Tu et al.

(10) Patent No.: US 12,388,691 B2
(45) Date of Patent: Aug. 12, 2025

(54) INTERFERENCE AND/OR CLUTTER CANCELLATION USING CROSS-CHANNEL EQUALIZATION

(71) Applicant: QUALCOMM Incorporated, San Diego, CA (US)

(72) Inventors: Sheng-Yuan Tu, San Diego, CA (US); Roberto Rimini, San Diego, CA (US); Anant Gupta, San Diego, CA (US); Ahmad Bassil Zoubi, San Diego, CA (US); Neevan Ramalingam, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 214 days.

(21) Appl. No.: 18/348,628

(22) Filed: Jul. 7, 2023

(65) Prior Publication Data

US 2024/0073068 A1    Feb. 29, 2024

Related U.S. Application Data

(60) Provisional application No. 63/373,838, filed on Aug. 29, 2022.

(51) Int. Cl.
*H04L 27/01* (2006.01)
*H04L 25/03* (2006.01)

(52) U.S. Cl.
CPC ........ *H04L 27/01* (2013.01); *H04L 25/03343* (2013.01); *H04L 2025/03426* (2013.01)

(58) Field of Classification Search
CPC ............... H04L 27/01; H04L 25/03343; H04L 2025/03426
See application file for complete search history.

(56) References Cited

U.S. PATENT DOCUMENTS 8,190,854 B2    5/2012  Codrescu et al.
8,755,738 B2    6/2014  Forutanpour et al.
(Continued)

FOREIGN PATENT DOCUMENTS

CN    101068123 A    11/2007
CN    102023292 B     8/2012
(Continued)

OTHER PUBLICATIONS

International Search Report and Written Opinion—PCT/US2023/069887—ISA/EPO—Mar. 18, 2024 18 pages.
(Continued)

*Primary Examiner* — Freshteh N Aghdam
(74) *Attorney, Agent, or Firm* — Smith Tempel Blaha LLC/Qualcomm Incorporated

(57) ABSTRACT

An apparatus is disclosed that implements interference and/or clutter cancellation using cross-channel equalization. In example aspects, the apparatus includes a wireless transceiver configured to be connected to multiple feed ports. The wireless transceiver is also configured to transmit an electromagnetic signal using a first feed port of the multiple feed ports. A modulated spur is generated based on the transmission of the electromagnetic signal. The wireless transceiver is additionally configured to receive two versions of a receive signal respectively via two feed ports of the multiple feed ports. The receive signal comprises the modulated spur and a mutual-coupling component associated with the transmission of the electromagnetic signal. The wireless transceiver is further configured to generate a filtered signal by attenuating the mutual-coupling component and the modulated spur within one of the two versions of the receive signal using cross-channel equalization.

30 Claims, 10 Drawing Sheets

(56) References Cited

U.S. PATENT DOCUMENTS

| | | |
|---|---|---|
| 9,369,187 B1 | 6/2016 | Sammeta et al. |
| 10,135,294 B1 | 11/2018 | Leabman |
| 10,698,079 B2 * | 6/2020 | Kushnir .......... H01Q 3/36 |
| 10,871,549 B2 | 12/2020 | Rimini et al. |
| 11,057,067 B1 * | 7/2021 | Hickle .......... H04B 1/109 |
| 2006/0049992 A1 | 3/2006 | Tsai |
| 2010/0214145 A1 * | 8/2010 | Narasimhan ........ H03M 1/1042 341/155 |
| 2010/0245159 A1 | 9/2010 | Krikorian et al. |
| 2011/0260920 A1 | 10/2011 | Dybdal et al. |
| 2014/0098681 A1 | 4/2014 | Stager et al. |
| 2014/0247757 A1 | 9/2014 | Rimini et al. |
| 2015/0078217 A1 | 3/2015 | Choi et al. |
| 2015/0236413 A1 | 8/2015 | Turpin et al. |
| 2015/0372725 A1 * | 12/2015 | Langer .......... H04B 1/0475 375/297 |
| 2016/0259037 A1 | 9/2016 | Molchanov et al. |
| 2016/0341821 A1 | 11/2016 | Wang |
| 2017/0290011 A1 | 10/2017 | Kushnir et al. |
| 2018/0034156 A1 | 2/2018 | Zhang et al. |
| 2018/0106897 A1 | 4/2018 | Shouldice et al. |
| 2018/0254852 A1 * | 9/2018 | Avivi .......... H04L 27/0002 |
| 2019/0238202 A1 | 8/2019 | Chavva et al. |
| 2020/0259515 A1 | 8/2020 | Mueck |
| 2020/0297236 A1 | 9/2020 | Rimini et al. |
| 2021/0376664 A1 | 12/2021 | Park et al. |
| 2022/0413129 A1 * | 12/2022 | Fan .......... G01S 13/89 |

FOREIGN PATENT DOCUMENTS

| | | |
|---|---|---|
| DE | 102015119482 A1 | 5/2017 |
| EP | 0660135 A2 * | 6/1995 |
| EP | 2352234 A1 | 8/2011 |
| EP | 3148051 A1 | 3/2017 |
| EP | 3511738 A2 | 7/2019 |

OTHER PUBLICATIONS

Mandal A., et al., "Digital Equalization for Cancellation of Noise-Like Interferences in Adaptive Spatial Filtering", Circuits, Systems and Signal Processing, Cambridge, MS, US, vol. 36, No. 2, May 11, 2016, pp. 675-702, 28 Pages, XP036138834, Abstract Introduction.
Partial International Search Report—PCT/US2023/069887—ISA/EPO—Jan. 26, 2024 12 pages.
Lu G., et al., "Contact-Free Measurement of Heartbeat Signal via a Doppler Radar Using Adaptive Filtering", Image Analysis and Signal Processing (IASP), 2010 International Conference on, IEEE, Piscataway, NJ, USA, Apr. 9, 2010 (Apr. 9, 2010), pp. 89-92, XP031683479, 4 Pages, ISBN: 978-1-4244-5554-6, the whole document.

* cited by examiner

900

Transmit an electromagnetic signal using a first feed port of multiple feed ports, a modulated spur generated based on the transmission of the electromagnetic signal
902

Receive two versions of a receive signal respectively via two feed ports of the multiple feed ports, the receive signal comprising the modulated spur and a mutual-coupling component associated with and the transmission of the electromagnetic signal
904

Generate a filtered signal by attenuating the mutual-coupling component and the modulated spur within one of the two versions of the receive signal using cross-channel equalization
906

FIG. 9

INTERFERENCE AND/OR CLUTTER CANCELLATION USING CROSS-CHANNEL EQUALIZATION

CROSS-REFERENCE TO RELATED APPLICATION(S)

This application claims the benefit of U.S. Provisional Application No. 63/373,838, filed 29 Aug. 2022, the disclosure of which is hereby incorporated by reference in its entirety herein.

TECHNICAL FIELD

This disclosure relates generally to wireless transceivers and, more specifically, to attenuating self-made interference and/or environmental clutter within a receiver.

BACKGROUND

To increase transmission rates and throughput, cellular and other wireless networks are using signals with higher frequencies and smaller wavelengths. As an example, $5^{th}$-generation (5G)-capable devices communicate with networks using frequencies that include those at or near the extremely-high frequency (EHF) spectrum (e.g., frequencies greater than 25 gigahertz (GHz)) with wavelengths at or near millimeter wavelengths. These signals have various technological challenges, such as higher path loss as compared to signals for earlier generations of wireless communications. In certain scenarios it can be difficult for a 5G wireless signal to travel far enough to make cellular communications feasible at these higher frequencies.

Transmit power levels can be increased or beamforming can concentrate energy in a particular direction to compensate for the higher path loss. These types of compensation techniques, however, increase power densities. The Federal Communications Commission (FCC) has determined a maximum permitted exposure (MPE) limit to accommodate these higher power densities. To meet targeted guidelines based on this MPE limit, devices balance performance with transmission power and other considerations. This balancing act can be challenging to realize given cost, size, functional design objectives and/or involved constraints.

SUMMARY

An apparatus is disclosed that implements interference and/or clutter cancellation using cross-channel equalization. In example implementations, a computing device employs proximity detection to detect nearby objects and adjusts transmission parameters for wireless communication based on relative positions of these objects. The computing device includes an interference and clutter cancellation module to attenuate or suppress self-made interference and/or environmental clutter. The self-made interference can include slow time-varying mutual coupling between antennas and/or fast time-varying modulated spurs generated during proximity detection. The environmental clutter represents another type of slow time-varying signal component. To attenuate the interference and/or clutter, the interference and clutter cancellation module employs cross-channel equalization, which equalizes the slow time-varying components across at least two channels of a receiver. After cross-channel equalization, one of the channels is used as a reference to cancel the slow time-varying component and/or fast time-varying component that is present within the other channel. This cancellation enables detection of weak reflections to be processed for proximity detection and a desired false-alarm rate to be realized.

In an example aspect, an apparatus is disclosed. The apparatus includes a wireless transceiver configured to be connected to multiple feed ports. The wireless transceiver is configured to transmit an electromagnetic signal using a first feed port of the multiple feed ports. A modulated spur is generated based on the transmission of the electromagnetic signal. The wireless transceiver is also configured to receive two versions of a receive signal respectively via two feed ports of the multiple feed ports. The receive signal comprises a mutual-coupling component associated with the transmission of the electromagnetic signal and the modulated spur. The wireless transceiver is additionally configured to generate a filtered signal by attenuating the mutual-coupling component and the modulated spur within one of the two versions of the receive signal using cross-channel equalization.

In an example aspect, an apparatus is disclosed. The apparatus includes means for transmitting an electromagnetic signal using a first feed port of multiple feed ports. A modulated spur is generated based on the transmission of the electromagnetic signal. The apparatus also includes means for receiving two versions of a receive signal respectively via two feed ports of the multiple feed ports. The receive signal comprises the modulated spur and a mutual-coupling component associated with the transmission of the electromagnetic signal. The apparatus additionally includes means for generating a filtered signal by attenuating the mutual-coupling component and the modulated spur within one of the two versions of the receive signal using cross-channel equalization.

In an example aspect, a method for interference and/or clutter cancellation using cross-channel equalization is disclosed. The method includes transmitting an electromagnetic signal using a first feed port of multiple feed ports. A modulated spur is generated based on the transmission of the electromagnetic signal. The method also includes receiving two versions of a receive signal respectively via two feed ports of the multiple feed ports. The receive signal comprises the modulated spur and a mutual-coupling component associated with the transmission of the electromagnetic signal. The method additionally includes generating a filtered signal by attenuating the mutual-coupling component and the modulated spur within one of the two versions of the receive signal using cross-channel equalization.

In an example aspect, an apparatus is disclosed. The apparatus includes a wireless transceiver configured to be connected to multiple feed ports. The wireless transceiver is configured to transmit an electromagnetic signal using a first feed port of the multiple feed ports. A modulated spur is generated based on the transmission of the electromagnetic signal. The modulated spur comprises a fast time-varying component having a magnitude or phase that varies substantially within a duration of a pulse of the electromagnetic signal. The wireless transceiver is also configured to receive two versions of a receive signal respectively via two feed ports of the multiple feed ports. The receive signal comprises the modulated spur. The wireless transceiver is further configured to satisfy a target false-alarm rate in the presence of the modulated spur.

BRIEF DESCRIPTION OF DRAWINGS

FIG. 2-1 illustrates an example operating environment for performing proximity detection using cross-channel equalization.

FIG. 2-2 illustrates another example operating environment for performing proximity detection using cross-channel equalization.

FIG. 9 is a flow diagram illustrating an example process for interference and/or clutter cancellation using cross-channel equalization.

DETAILED DESCRIPTION

Figure 1:
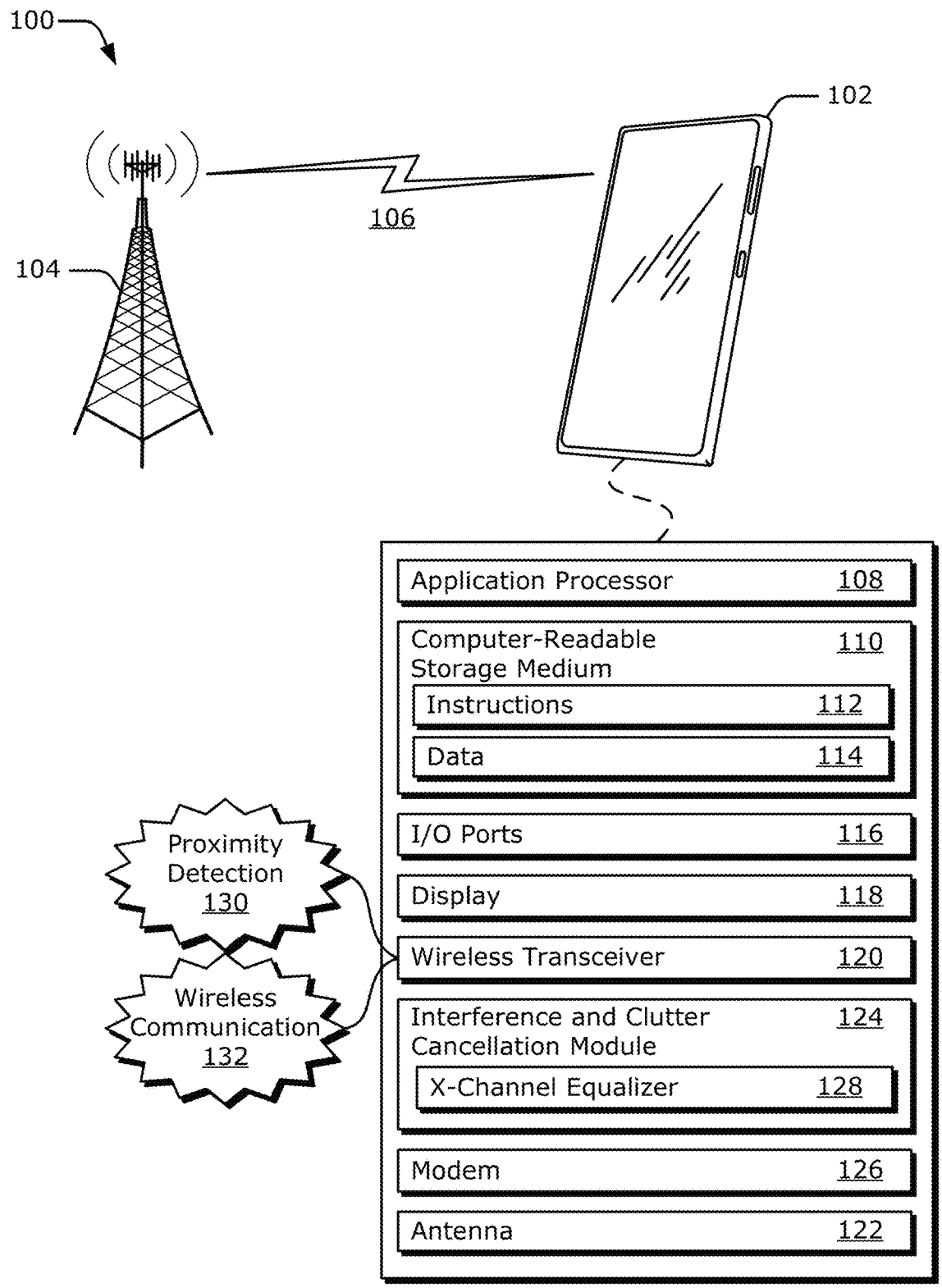
FIG. 1 illustrates an example operating environment for interference and/or clutter cancellation using cross-channel equalization.

Current high-frequency and small-wavelength communications balance performance with a need to meet the Federal Communications Commission's maximum permitted exposure limit (e.g., the FCC's MPE limit). Inefficient balancing can prevent devices from taking full advantage of increased data rates (e.g., those enabled by 5G wireless communications). Because exposure is affected by a proximity of a user to a device's antenna, however, techniques described in this document enable greater wireless performance while staying within the FCC's MPE limit. To do so, these techniques detect a user's proximity to a device. Based on the detected proximity, the device can balance a power density of transmitted wireless signals with the requirement to meet the MPE limit. As a result, the device is permitted to transmit wireless signals with higher average power levels, which enables the wireless signals to travel farther, such as between a smart phone and a remote cellular base station. Devices and techniques described herein may additionally or alternatively be used to comply with radio frequency exposure requirements promulgated by an organization or jurisdiction outside of the United States.

Some proximity-detection techniques may use a dedicated sensor to detect the user, such as a camera or an infrared sensor. However, these sensors may be bulky or expensive. Furthermore, a single electronic device can include multiple antennas that are positioned on different surfaces (e.g., on a top, a bottom, or opposite sides). To account for each of these antennas, multiple cameras or sensors may need to be installed near each of these antennas, which further increases a cost and size of the electronic device.

In contrast, techniques for proximity detection with interference and/or clutter cancellation using cross-channel equalization are described herein. The described techniques utilize a wireless transceiver and antennas within a computing device to perform proximity detection and optionally determine a relative position of an object (e.g., a range and/or angle to the object). With proximity detection, a transmission parameter that is used for wireless communication can be adjusted to enable the wireless transceiver to meet guidelines promulgated by the government or the wireless industry, such as a Maximum Permitted Exposure (MPE) limit as determined by the Federal Communications Commission (FCC). Furthermore, by actively detecting an object's relative position, a surrounding environment can be continually monitored and the transmission parameter can be incrementally adjusted to account for movement by the object while achieving a desired false-alarm rate. Additionally, devices and techniques described herein may additionally or alternatively be used for or modified for purposes other than exposure compliance, for example to detect objects other than a user, to map an environment, for other forms of radio frequency (RF) or millimeter-wave (mmW) sensing, for sensor assisted communication or joint communicating and sensing, etc.

Due to a proximity of the antennas with respect to each other, the antennas can be mutually coupled such that energy leaks between a transmitting antenna and a receiving antenna. During proximity detection, this mutual coupling can raise a noise floor of the wireless transceiver and make it challenging to detect objects. The wireless transceiver can also receive modulated spurs (or modulated spurious signals), which are generated by the wireless transceiver during transmission. Additionally or alternatively, the wireless transceiver can receive reflections of clutter within an external environment. During proximity detection, the computing device can incorrectly identify the modulated spur and/or environmental clutter as an object-of-interest, which can degrade the false-alarm-rate performance of the computing device.

To detect the object in the presence of this self-made interference and/or environmental clutter, an interference and clutter cancellation module of the computing device processes at least two receive signals in such a way as to suppress or attenuate slow time-varying components (e.g., the mutual coupling or environmental clutter) and/or fast time-varying components (e.g., the modulated spurs) within at least one of the two receive signals. The at least two receive signals can be obtained from at least two feed ports that are associated with a same antenna or different antennas. To attenuate the interference and/or clutter, the interference and clutter cancellation module employs cross-channel equalization, which equalizes the slow time-varying components across the at least two receive signals. After cross-channel equalization, one of the equalized receive signals is used as a reference to cancel the slow time-varying component and/or fast time-varying component within the other equalized receive signal. This cancellation enables detection of weak reflections to be processed for proximity detection and enables the computing device to realize a desired false-alarm rate.

Some embodiments may offer a relatively inexpensive approach that can utilize existing transceiver hardware and antennas. The interference and clutter cancellation module may marginally impact a design of the wireless transceiver and can be implemented in software or hardware. The described techniques need not utilize a calibration procedure or training sequence (e.g., those involving a characterization of a mutual coupling channel, a modulated spur, or clutter). Instead, estimations of the interference and/or environmental clutter is made in real-time, thereby enabling responsive adaptation to various changes, including changes in antenna impedance (e.g., changes in a proximity of a user's hand to an antenna), antenna load variations (e.g., changes in solar loading), or changes in the environment. With this adaptive capability, proximity detection can be performed using a variety of different antenna designs or antenna array configurations.

In some implementations, the computing device may be utilized in stand-alone proximity-detection applications. For example, the computing device can be implemented as an automotive bumper sensor to assist with parking or autonomous driving. As another example, the computing device can be installed on a drone to provide collision avoidance. In other implementations, the computing device can selectively perform proximity detection or wireless communication. In such cases, dual-use of components within the wireless transceiver of a computing device may be enabled, which decreases cost and size of the wireless transceiver, as well as the computing device. Based on the proximity detection, and as described herein, transmission parameters can be adjusted for wireless communication to enable the wireless transceiver to meet safety guidelines promulgated by the government or the wireless industry, such as the MPE limit as determined by the FCC.

FIG. 1 illustrates an example environment 100 for interference and clutter cancellation using cross-channel equalization. In the environment 100, a computing device 102 communicates with a base station 104 through a wireless communication link 106 (wireless link 106). In this example, the computing device 102 is depicted as a smartphone. However, the computing device 102 can be implemented as any suitable computing or electronic device, such as a modem, a cellular base station, a broadband router, an access point, a cellular phone, customer premises equipment (CPE), a gaming device, a navigation device, a media device, a laptop computer, a desktop computer, a tablet computer, a wearable computer, a server, a network-attached storage (NAS) device, a smart appliance or other internet of things (IoT) device, a medical device, a vehicle-based communication system, a radar, a radio apparatus, and so forth.

The base station 104 communicates with the computing device 102 via the wireless link 106, which can be implemented as any suitable type of wireless link. Although depicted as a tower of a cellular network, the base station 104 can represent or be implemented as another device, such as a satellite, a server device, a terrestrial television broadcast tower, an access point, a peer-to-peer device, another smartphone, a mesh network node, and so forth. Therefore, the computing device 102 may communicate with the base station 104 or another device via a wireless connection.

The wireless link 106 can include a downlink of data or control information communicated from the base station 104 to the computing device 102, an uplink of other data or control information communicated from the computing device 102 to the base station 104, or both a downlink and an uplink. The wireless link 106 can be implemented using any suitable communication protocol or standard, such as $2^{nd}$-generation (2G), $3^{rd}$-generation (3G), $4^{th}$-generation (4G), or $5^{th}$-generation (5G) cellular; IEEE 802.11 (e.g., Wi-Fi®); IEEE 802.15 (e.g., Bluetooth® or UWB); IEEE 802.16 (e.g., WiMAX®); and so forth. In some implementations, the wireless link 106 may wirelessly provide power and the base station 104 or the computing device 102 may comprise a power source.

As shown, the computing device 102 includes an application processor 108 and a computer-readable storage medium 110 (CRM 110). The application processor 108 can include any type of processor, such as a multi-core processor, that executes processor-executable code stored by the CRM 110. The CRM 110 can include any suitable type of data storage media, such as volatile memory (e.g., random access memory (RAM)), non-volatile memory (e.g., Flash memory), optical media, magnetic media (e.g., disk), and so forth. In the context of this disclosure, the CRM 110 is implemented to store instructions 112, data 114, and other information of the computing device 102, and thus does not include transitory propagating signals or carrier waves.

The computing device 102 can also include input/output ports 116 (I/O ports 116) and a display 118. The I/O ports 116 enable data exchanges or interaction with other devices, networks, or users. The I/O ports 116 can include serial ports (e.g., universal serial bus (USB) ports), parallel ports, audio ports, infrared (IR) ports, user interface ports such as a sensing portion of a touchscreen, and so forth. The display 118 presents graphics of the computing device 102, such as a user interface associated with an operating system, program, or application. Alternatively or additionally, the display 118 can be implemented as a display port or virtual interface, through which graphical content of the computing device 102 is presented, and/or the display 118 can be omitted.

A wireless transceiver 120 of the computing device 102 provides connectivity to respective networks and other electronic devices connected therewith. The wireless transceiver 120 can facilitate communication over any suitable type of wireless network, such as a wireless local area network (WLAN), peer-to-peer (P2P) network, mesh network, cellular network, ultra-wideband (UWB) network, wireless wide-area-network (WWAN), and/or wireless personal-area-network (WPAN). In the context of the example environment 100, the wireless transceiver 120 enables the computing device 102 to communicate with the base station 104 and networks connected therewith. However, the wireless transceiver 120 can also enable the computing device 102 to communicate "directly" with other devices or networks.

The wireless transceiver 120 includes circuitry and logic for transmitting and receiving signals via an antenna 122. Components of the wireless transceiver 120 can include amplifiers, switches, mixers, analog-to-digital converters, digital-to-analog converters, filters, and so forth for conditioning signals (e.g., for generating or processing signals). The wireless transceiver 120 can also include logic to perform in-phase/quadrature (I/Q) operations, such as synthesis, encoding, modulation, decoding, demodulation, and so forth. In some cases, components of the wireless transceiver 120 are implemented as separate transmitter and receiver entities. Additionally or alternatively, the wireless transceiver 120 can be realized using multiple or different sections to implement respective transmitting and receiving operations (e.g., separate transmit and receive chains). In general, the wireless transceiver 120 processes data and/or signals associated with communicating data of the computing device 102 over the antenna 122 and/or processes signals associated with proximity detection.

In the example shown in FIG. 1, the computing device 102 includes at least one interference and clutter cancellation module 124 and at least one modem 126. The interference and clutter cancellation module 124 can be a separate module or integrated within the wireless transceiver 120 and/or the modem 126. In general, the interference and clutter cancellation module 124 can be incorporated in or realized using software, firmware, hardware, fixed logic circuitry, or combinations thereof. The interference and clutter cancellation module 124 can be implemented within an integrated circuit or as part of the modem 126 or other electronic component of the computing device 102. In some implementations, the modem 126 may execute computer-executable instructions that are stored within the CRM 110 to implement the interference and clutter cancellation module 124.

In operation, the interference and clutter cancellation module 124 can cancel self-made interference (e.g., interference due to mutual coupling or modulated spurs) as well as environmental clutter to enable detection of relatively weak signal components that are analyzed for proximity detection. Attenuating the self-made interference and environmental clutter also enables the computing device 102 to operate within a target false-alarm rate. To achieve this, the interference and clutter cancellation module 124 implements an adaptive scheme that can estimate both slow time-varying components and fast time-varying components for subsequent cancellation. The slow time-varying components vary detectably in magnitude and/or phase across successive pulses (e.g., across an inter-pulse period (IPP) of an electromagnetic signal 226). The fast time-varying components vary detectably in magnitude and/or phase within each pulse (e.g., across a duration of each pulse of the electromagnetic signal 226). In comparison, the fast time-varying components vary appreciably more in magnitude and/or phase relative to the slow time-varying components across a given pulse (or during a given pulse). The amount of variation in magnitude or phase can be approximately 5% or more (e.g., approximately 10%, 20%, 50% or more) of a median value for a given time frame.

The interference and clutter cancellation module 124 includes at least one cross-channel equalizer 128 (x-channel equalizer 128), which can at least partially implement cross-channel equalization. In particular, the cross-channel equalizer equalizes the slow time-varying components across at least two receive channels. This equalization enables the interference and clutter cancellation module 124 to use one of the receive channels as a reference channel to cancel the slow time-varying component and/or fast time-varying component from the other receive channel. By cancelling these components, the interference and clutter cancellation module 124 reduces a likelihood of the computing device 102 making false detections, particularly false detections based on the slow time-varying component and/or the fast time-varying component. As a result, the computing device 102 can satisfy a target false-alarm-rate performance in the presence of mutual coupling, a modulated spur, and/or clutter. The computing device 102 satisfies a target false-alarm-rate performance by declaring fewer false alarms within a set amount of time compared to a false-alarm-rate threshold.

The modem 126, which can be implemented as a processor, controls the wireless transceiver 120 and enables proximity detection 130 or wireless communication 132 to be performed. The modem 126 can include a portion of the CRM 110 or can access the CRM 110 to obtain computer-readable instructions. The modem 126 can include baseband circuitry to perform high rate sampling processes that can include analog-to-digital conversion, digital-to-analog conversion, Fourier transforms, gain correction, skew correction, frequency translation, and so forth. The modem 126 can provide communication data to the wireless transceiver 120 for transmission. The modem 126 can also process a baseband version of a signal obtained from the wireless transceiver 120 to generate data, which can be provided to other parts of the computing device 102 via a communication interface for proximity detection 130 or wireless communication 132.

The computing device 102 can also include a controller (not separately shown), e.g., to realize the interference and clutter cancellation module 124. The controller can include at least one processor and CRM, which stores computer-executable instructions (such as the application processor 108, the CRM 110, and the instructions 112). The processor and the CRM can be localized at one module or one integrated circuit chip or can be distributed across multiple modules or chips. Together, a processor and associated instructions can be realized in separate circuitry, fixed logic circuitry, hard-coded logic, and so forth. The controller can be implemented as part of the wireless transceiver 120, the modem 126, the application processor 108, a special-purpose processor configured to perform MPE techniques, a general-purpose processor, some combination thereof, and so forth.

In an example implementation, the wireless transceiver 120 supports proximity detection 130 and wireless communication 132. In other words, the wireless transceiver 120 can be configured to perform proximity detection 130 during a first time interval and perform wireless communication 132 during a second time interval. In other example implementations, the wireless transceiver 120 supports proximity detection 130 and does not support wireless communication 132. In this case, the wireless transceiver 120 can be a transceiver of a dedicated radar system, which is integrated within the computing device 102 or a stand-alone radar system. In still other example implementations, the wireless transceiver 120 supports other applications, which can benefit from aspects of interference and/or clutter cancellation using cross-channel equalization. In other examples, separate transceivers are respectively configured for proximity detection 130 and wireless communication 132.

Figures 1, 2:
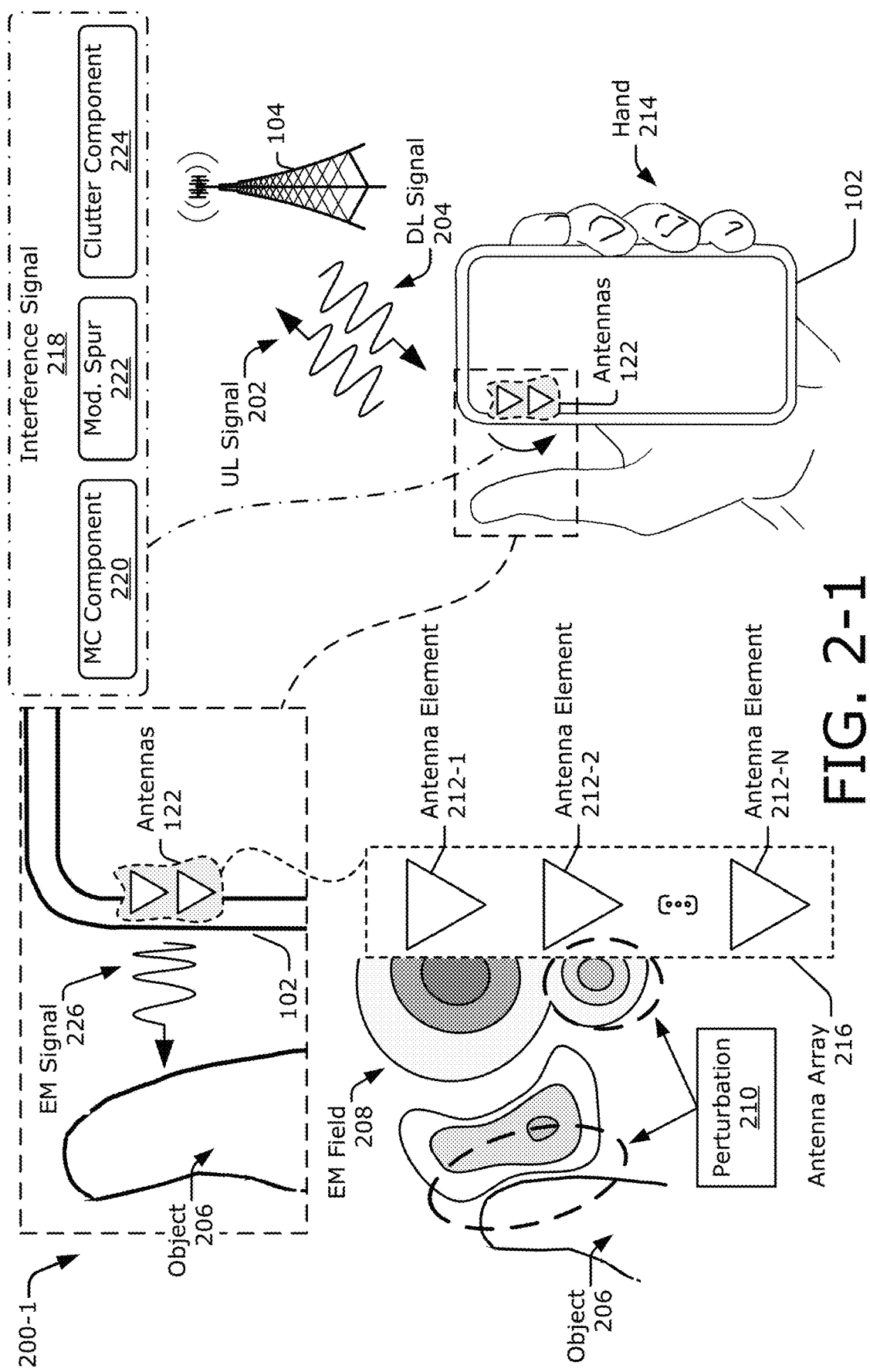
Figure 2:
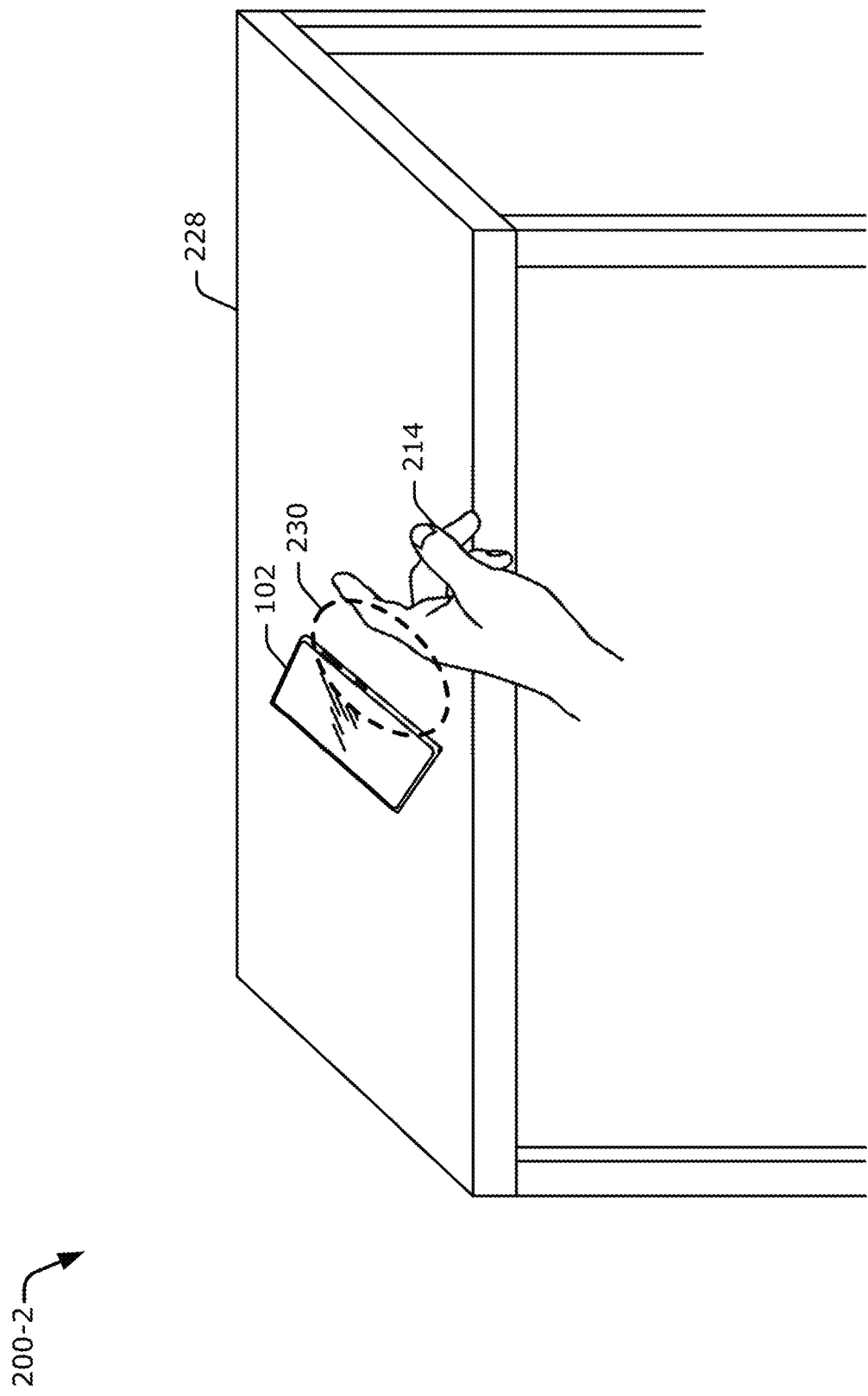

FIG. 2-1 illustrates an example operating environment 200-1 for proximity detection 130. In the example environment 200-1, a hand 214 of a user holds the computing device 102. In one aspect, the computing device 102 communicates with the base station 104 by transmitting an uplink signal 202 (UL signal 202) or receiving a downlink signal 204 (DL signal 204) via the two or more antennas 122. A user's thumb, however, can represent a proximate object 206 that may be exposed to radiation via the uplink signal 202. Other situations are also possible in which the user represents the proximate object 206, including those in which the user is near the computing device 102 but not physically touching the computing device 102, as later shown in FIG. 2-2.

To detect whether the object 206 exists or is within a detectable range, the computing device 102 generally transmits an electromagnetic (EM) signal 226 (EM signal 226) via at least one of the antennas 122. In a near field, the electromagnetic signal 226 can be referred to as an electromagnetic (EM) field 208. In a far field, the electromagnetic signal 226 can be referred to as a radar transmit signal (not shown in FIG. 2-1). In some cases, the electromagnetic signal 226 may be generated such that it includes a single frequency or tone or multiple frequencies or tones. For example, the electromagnetic signal 226 can include a frequency-modulated continuous wave (FMCW) signal (e.g., a linear frequency-modulated (LFM) continuous wave signal or chirp signal, a triangular frequency-modulated continuous wave signal, a sawtooth frequency-modulated continuous wave signal, and so forth).

The antennas 122 may be arranged via modules and/or arrays and may have a variety of configurations. For example, the antennas 122 may comprise at least two different antennas, at least two antenna elements 212 of an antenna array 216 (as shown towards the bottom of FIG.

2-1), at least two antenna elements 212 associated with different antenna arrays 216, or any combination thereof. The antenna array 216 is shown to include multiple antenna elements 212-1 to 212-N, where N represents a positive integer greater than one. Further, the array 216 may be a multi-dimensional array. Additionally or alternatively, the antenna array 216 may be configured for beam management techniques, such as beam determination, beam measurement, beam reporting, or beam sweeping. A distance between the antenna elements 212 in the antenna array 216 can be based on frequencies that the wireless transceiver 120 emits. For example, the antenna elements 212 in the antenna array 216 can be spaced by approximately half a wavelength from each other (e.g., by approximately half a centimeter apart for frequencies around 30 GHz). The antennas 122 may be implemented using any type of antenna, including patch antennas, dipole antennas, bowtie antennas, or a combination thereof, as further described with respect to FIG. 4.

An example near-field case is further illustrated at the bottom left of FIG. 2-1. Here, an amplitude of the electromagnetic field 208 is illustrated with different shades of grey, where darker shades represent higher amplitudes and lighter shades represent lower amplitudes. If the object 206 is proximate to one of the antenna elements 212 (e.g., one of the antennas 122), interactions of the object 206 with the electromagnetic field 208 produce one or more perturbations (e.g., disturbances or changes) in the electromagnetic field 208, such as perturbation 210. The perturbation 210 represents a variation in a magnitude or phase of the electromagnetic field 208 due to the object 206 causing different constructive or destructive patterns to occur within the electromagnetic field 208. In some implementations, the electromagnetic field 208 is configured such that objects 206 within approximately five centimeters (cm) can be detected, including objects within three or four centimeters. For some frequencies of the electromagnetic field 208, this distance can be associated with a near-field region.

In the depicted example, a first antenna element 212-1 emits the electromagnetic field 208, and a second antenna element 212-2 senses the perturbation 210 for proximity detection 130. The second antenna element 212-2 may be co-located with respect to the first antenna element 212-1 as part of the antenna array 216 or otherwise proximate to the first antenna element 212-1. In some cases, the second antenna element 212-2 is adjacent to the first antenna element 212-1 within a same antenna array 216 (e.g., there are no antenna elements 212 physically located between the first antenna element 212-1 and the second antenna element 212-2). The same antennas 122 or a subset of the same antennas 122 used to communicate with the base station 104 can be used for proximity detection 130. In other examples, one or more of the antennas 122 used for proximity detection 130 are not used for communicating with the base station 104.

A response of the second antenna element 212-2 to the electromagnetic field 208 is affected by the object 206 reflecting or absorbing the electromagnetic field 208 and also by any mutual coupling or interference. This interference is represented by interference signal 218, which can include a mutual-coupling component 220 (MC component 220), a modulated spur 222 (mod. spur 222), and/or a clutter component 224.

The mutual-coupling component 220 represents energy that leaks between a transmitting antenna 122 and a receiving antenna 122 during proximity detection 130. A magnitude and phase of the mutual-coupling component 220 can vary slowly across each pulse of the electromagnetic signal 226 (e.g., across each pulse of the electromagnetic field 208 or the radar transmit signal). As such, the mutual-coupling component 220 can be referred to as a slow time-varying component. Variations in the mutual-coupling component 220 can be caused, at least in part, by changes in antenna impedance or load variations. For example, such variations can occur due to a proximity of the user's hand 214 to the antennas 122, solar loading, or temperature fluctuations.

The modulated spur 222 represents a spurious signal that is generated based on the transmission of the electromagnetic signal 226 (e.g., based on the transmission of the electromagnetic field 208 or the radar transmit signal) and is modulated in frequency similar to the electromagnetic signal 226. The modulated spur 222 can be inherently produced by components within the wireless transceiver 120 that have realistic (e.g., non-ideal) performance characteristics. Example components that can produce a spur include amplifiers and mixers. In comparison to the mutual-coupling component 220, a magnitude and/or phase of the modulated spur 222 can vary quickly across each pulse of the electromagnetic signal 226. In other words, a frequency of the modulated spur 222 can be substantially higher than a frequency of the mutual-coupling component 220. The modulated spur 222 can be referred to as a fast time-varying component.

The mutual-coupling component 220 and the modulated spur 222 can be co-linear due to their relationship to a common transmitter (e.g., because they are associated with a same transmit path). This means that the mutual-coupling component 220 and the modulated spur 222 present within one receive channel can be related to the mutual-coupling component 220 and the modulated spur 222 that is present within another receive channel by a scaling factor.

The clutter component 224 represents a portion of the electromagnetic signal 226 (e.g., the electromagnetic field 208 or the radar transmit signal) that is reflected by environmental clutter. The environmental clutter can include an object that exists outside of the computing device 102 or a component that is internal to the computing device 102, such as a housing of the computing device 102. In many situations, the clutter is stationary and/or present at close ranges to the antennas 122. The clutter component 224 can have a magnitude and phase that vary slowly across each pulse of the electromagnetic signal 226. As such, the clutter component 224 can be referred to as a slow time-varying component. The mutual-coupling component 220, the modulated spur 222, and the clutter component 224 are further described with respect to FIG. 6.

In some implementations, the wireless transceiver 120 can generate the electromagnetic signal 226 via the first antenna element 212-1 during a same time that the second antenna element 212-2 is used to receive a version of the electromagnetic signal 226 (e.g., to sense the electromagnetic field 208 or receive a reflected version of the radar transmit signal). In the near-field case, energy from the electromagnetic field 208 induces a current in the second antenna element 212-2, which is used to measure the perturbation 210 or the resulting electromagnetic field 208 that is disturbed by the object 206. By sensing the perturbation 210, a determination can be made as to whether the object 206 is present or outside a detectable range (e.g., not present). The detectable range may be within approximately 5 cm from the antennas 122, between 0 and 4 cm from the antennas 122, and so forth.

In the far-field case, the second antenna element 212-2 receives a version of the radar transmit signal that is reflected by the object 206. This reflected version of the radar transmit signal is referred to as a radar receive signal. The radar receive signal can have a different phase and/or frequency relative to the radar transmit signal and the interference signal 218 based on reflection properties and/or motion of the object 206. In general, the radar receive signal contains information that can be used for detecting the object 206 and for determining a range to the object 206.

In general, the detectable range can vary based on transmission power or sensitivity of the wireless transceiver 120. A duration for which the electromagnetic signal 226 is generated can also be based on the detectable range. Example durations can range from approximately one microsecond to several tens of microseconds.

In the far-field case, the detectable range can include ranges that can be readily measured using radar-based techniques. In the near-field case, however, the detectable range can include ranges that are not readily measured using radar-based techniques. For example, the radar-based techniques can be limited to ranges that are farther than a minimum range, which is proportional to a bandwidth of the FMCW signal. Example minimum ranges include 4 cm or 2 cm for a FMCW signal having a bandwidth of 4 GHz or 8 GHz, respectively. Therefore, to detect closer distances using radar-based techniques, the wireless transceiver 120 generates larger bandwidth signals at an expense of increased design complexity or increased cost of the wireless transceiver 120. Using the described techniques, however, the range to the object 206 can be measured at distances closer than these minimum ranges. In this way, the described techniques can be used to augment close-range detection even if radar-based techniques are used for far-range detection.

A propagation distance between the antenna element 212 and the object 206 and a partial absorption of the electromagnetic signal 226 via the object 206 may cause the received signal (e.g., the sensed perturbation 210 or the radar receive signal) to be weaker relative to the interference signal 218. In general, responses of the receiving antennas 122 contain information that can be used for detecting the object 206 and optionally determining a relative position of the object 206 (e.g., determining a range and/or angle to the object 206).

In one aspect, the interference signal 218 can exist within the responses of the receiving antennas 122 due to a direct or indirect coupling between the transmitting antenna 122 and the receiving antennas 122 (e.g., the antennas 122 are mutually coupled). In the depicted configuration, the antennas 122 are co-located or otherwise proximate to one another. Due to this proximity, the antennas 122 are mutually coupled electromagnetically such that a portion of the energy that is radiated via one of the antennas 122 generates interference that makes it challenging to detect the object 206 (assuming the object 206 is present). In another aspect, the interference signal 218 additionally or alternatively exists within the response due to a direct or indirect coupling between a transmitter, which generates the electromagnetic signal 226, and a receiver, which receives the antenna response.

In some cases, the interference signal 218 is significantly stronger in magnitude than a portion of a received signal that is associated with the object 206 (e.g., a portion of the receive signal that is associated with the perturbation 210 or the radar receive signal). As such, the interference signal 218 can prevent the computing device 102 from detecting the object 206, absent implementation of a technique to cancel (e.g., attenuate or suppress) the interference signal 218. For example, the portion of the receive signal that is associated with the object 206 can be obscured by sidelobes of the interference signal 218. The interference and clutter cancellation module 124, however, attenuates the interference signal 218 to enable the object 206 to be detected (if present) in the presence of mutual coupling 220, modulated spurs 222, and/or environmental clutter 224. This attenuation also enables the computing device 102 to avoid false detections, including in situations in which the object 206 is not present. Based on the proximity detection 130, a transmission parameter can be adjusted for use during wireless communication 132.

FIG. 2-2 illustrates another example operating environment 200-2 for performing proximity detection 130. In contrast to the environment 200-1 of FIG. 2-2, the computing device 102 is not held by the user in environment 200-2. In the example environment 200-2, the computing device 102 is positioned on a table 228 (or more generally a surface) and is within arm's reach to the user. Other situations are also possible, such as the computing device 102 being propped up on a table and the user watching a video on the computing device 102 from a distance.

As the user moves around within a proximity of the computing device 102, their hand 214 can move into a detectable range, as indicated at 230. By performing proximity detection 130 with cross-channel equalization, the computing device 102 can detect the user's hand 214 and attenuate any interference signals 218. An example sequence of the computing device 102 switching between proximity detection 130 and wireless communication 132 is further described with respect to FIG. 3.

Figure 3:
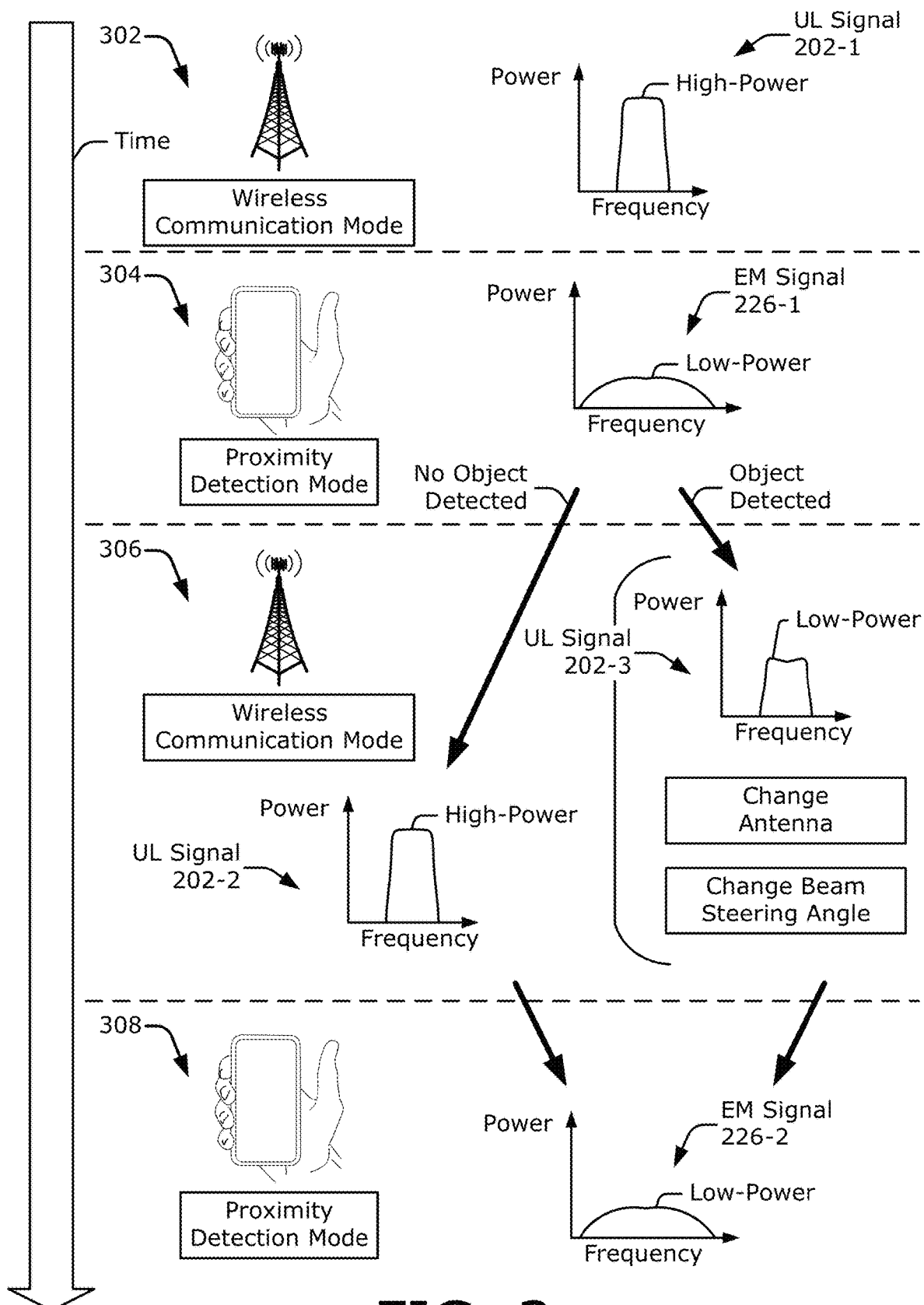
FIG. 3 illustrates an example sequence flow diagram for proximity detection using cross-channel equalization.

FIG. 3 illustrates an example sequence flow diagram for proximity detection 130, with time elapsing in a downward direction. Examples of a wireless communication mode are shown at 302 and 306, and examples of a proximity detection mode are shown at 304 and 308. The proximity detection mode can occur at fixed time intervals, between active data cycles that occur during wireless communication 132, at predetermined times as set by the modem 126, as part of an initialization process before wireless communications 132 occur, responsive to detection of device movement, or based on indications that the user may be proximate to the device (e.g., based on the wireless transceiver 120 observing a decrease in power in a downlink signal 204 or the application processor 108 determining that the user is interacting with the display 118 of the computing device 102), etc.

At 302, the wireless transceiver 120 transmits a high-power (e.g., normal) uplink signal 202-1 configured to provide sufficient range to a destination, such as a base station 104. After transmitting the uplink signal 202-1, the electromagnetic signal 226-1 (or proximity detection signal) is transmitted via the wireless transceiver 120 and the antennas 122 at 304. As described above, the electromagnetic signal 226 enables the computing device 102 to detect an object 206 and determine if the object 206 is near the computing device 102. In this case, the electromagnetic signal 226-1 is represented by a low-power wide-band signal. Based on a detection, the wireless transceiver 120 can adjust a transmission parameter for a next uplink signal 202 to account for MPE compliance guidelines.

The proximity detection mode can also determine the range to the object 206 in some examples, thereby enabling transmission of the uplink signal 202 to comply with range-dependent guidelines, such as a maximum power density. Because power density is proportional to transmit power and inversely proportional to range, an object 206 at a closer range is exposed to a higher power density than another object 206 at a farther range for a same transmit power level. Therefore, a similar power density at the object 206 can be achieved by increasing the transmit power level if the object 206 is at a farther range and decreasing the transmit power level if the object 206 is at a closer range. In this way, the wireless transceiver 120 can adjust transmission of the uplink signal 202 to enable the power density at the object 206 for both the closer range and the farther range to be below the maximum power density. At the same time, because the range is known, the transmit power level can be increased to a level that facilitates wireless communication 132 and comports with the compliance guideline.

At 306, the wireless transceiver 120 transmits a next uplink signal 202. In the depicted example, a high-power uplink signal 202-2 is transmitted if an object 206 is not detected. Alternatively, a low-power uplink signal 202-3 is transmitted if the object 206 is detected. The low transmit power can be, for example, between approximately five and twenty decibel-milliwatts (dBm) less than the high-power signal at 302. In addition to or instead of changing a power of the next uplink signal 202, the uplink signal 202 can be transmitted using a different antenna within the computing device 102 or using a different beam steering angle (e.g., different than the antennas 122 or the beam steering angle used for transmitting the uplink signal 202-1 at 302). Although not shown, the wireless transceiver 120 can alternatively skip the wireless communication mode at 306 and perform another proximity detection mode using another antenna 122 or a different transmit power level to detect objects 206 at various locations or distances around the computing device 102. While certain operations were described above based on a range to the object 206, it will be appreciated that operations in the wireless communication mode at 306 or adjustments made pursuant to the proximity detection mode at 304 may be based merely upon whether the object 206 is present or not, irrespective of the range thereto.

At 308, the wireless transceiver 120 and antennas 122 transmit another electromagnetic signal 226-2 (e.g., another proximity detection signal) to attempt to detect the object 206. By scheduling multiple proximity detection modes over some time period, transmission of the uplink signal 202 can be dynamically adjusted based on a changing environment or movement by the object 206. Furthermore, appropriate adjustments can be made to balance communication performance with compliance or radiation requirements.

The sequence described above can also be applied to other antennas. The other antennas and the antennas 122 may transmit multiple electromagnetic signals 226 sequentially or in parallel. To enable proximity detection 130 in the presence of self-made interference and/or environmental clutter, the wireless transceiver 120 receives antenna responses via at least two feed ports, which are further described with respect to FIG. 4.

Figure 4:
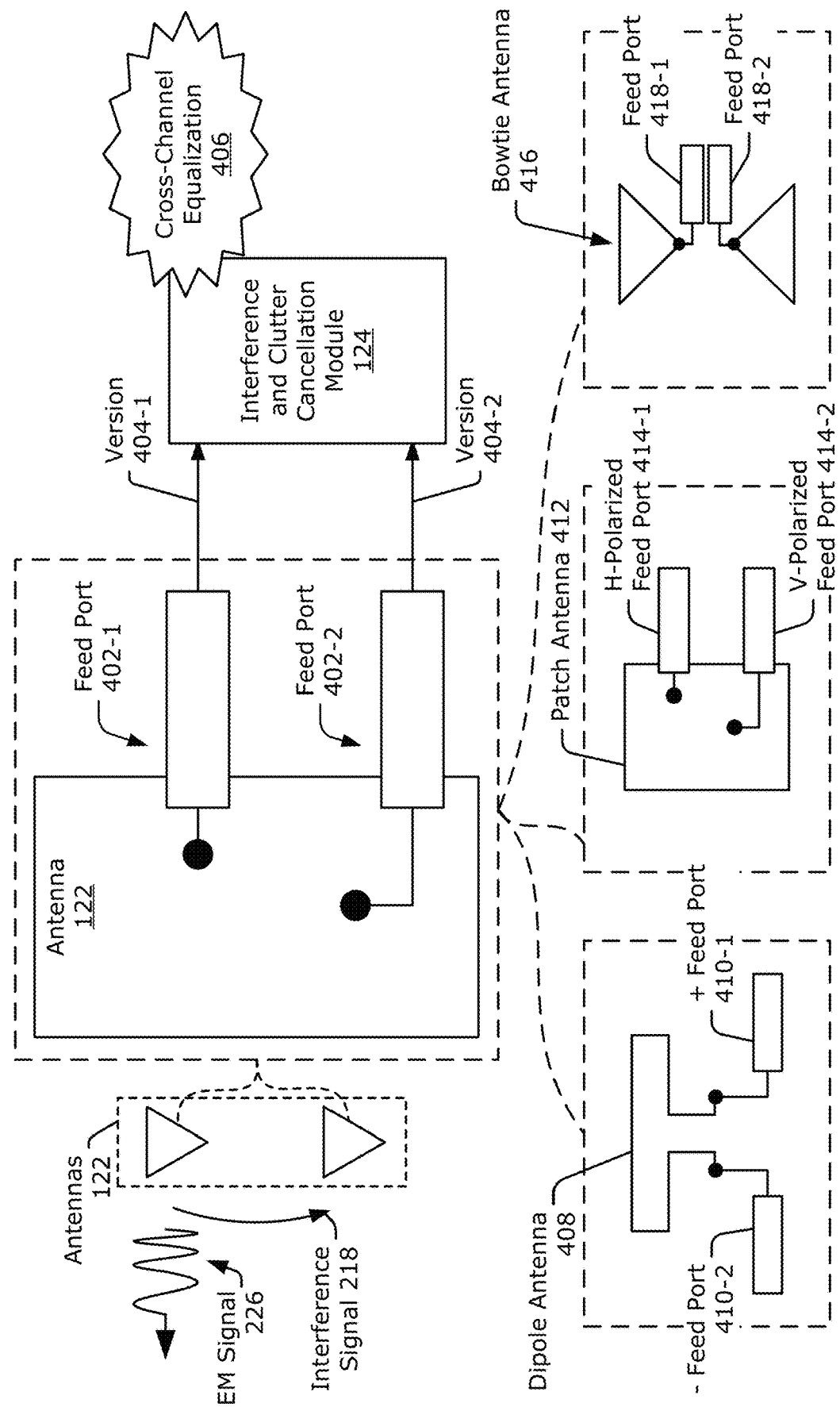
FIG. 4 illustrates multiple examples of an antenna for interference and/or clutter cancellation using cross-channel equalization.

FIG. 4 illustrates an example antenna 122 for interference and/or clutter cancellation using cross-channel equalization and three example implementations thereof. The example antenna 122 illustrated in FIG. 4 can be used to implement either of the antennas 122 (e.g., a transmitting antenna or a receiving antenna). In general, the antenna 122 in FIG. 4 is described with respect to a receiving antenna 122. In the depicted configuration (in the top half of FIG. 4), the antenna 122 includes multiple feed ports 402, such as a first feed port 402-1 and a second feed port 402-2. The response of the antenna 122 to the electromagnetic signal 226 is separated into multiple versions 404, such as versions 404-1 and 404-2 respectively obtained via the feed ports 402-1 and 402-2. Although similar, the multiple versions 404 of the antenna response vary due to differences in a type of feed port 402 or differences due to location or orientation of the feed ports 402-1 and 402-2. These versions 404-1 and 404-2 are used by the interference and clutter cancellation module 124 to perform cross-channel equalization 406, which is further described with respect to FIG. 8.

Three example types of antenna 122 are depicted towards the bottom of FIG. 4. In one example, the antenna 122 comprises a dipole antenna 408, which includes a pair of differential feed ports 410 (e.g., a positive (+) feed port 410-1 and a negative (−) feed port 410-2). Thus, the feed ports 402-1 and 402-2 can be implemented using the differential feed ports 410-1 and 410-2 such that the versions 404-1 and 404-2 are out-of-phase with respect to each other (e.g., differ in phase by approximately 180 degrees). As another example, the antenna 122 comprises a patch antenna 412, which includes a horizontally-polarized feed port 414-1 and a vertically-polarized feed port 414-2. Accordingly, the versions 404-1 and 404-2 have orthogonal polarities if the feed ports 402-1 and 402-2 are implemented using the polarized feed ports 414. In this instance, the versions 404-1 and 404-2 respectively represent a horizontally-polarized version and a vertically-polarized version, but diagonal or other polarizations may be implemented. As yet another example, the antenna 122 comprises a bowtie antenna 416, which includes directional feed ports 418-1 and 418-2. In this case, the versions 404-1 and 404-2 represent different angular directions that are sensed along different angles of arrival.

In FIG. 4, the feed ports 402 and the versions 404 of the antenna responses are shown to be associated with the antenna 122. Alternatively, the feed ports 402 and the versions 404 may be obtained using two different antennas 122. In some implementations, the interference and clutter cancellation module 124 accepts versions 404 of the antenna response that are each associated with multiple antennas 122.

Consider a case in which the wireless transceiver 120 performs analog or hybrid beamforming. In this case, beamforming circuitry (not shown) is coupled between the feed ports 402 and the interference and clutter cancellation module 124. During operation, the beamforming circuitry combines corresponding versions 404 of the antenna responses across multiple antennas 122. For example, the beamforming circuitry combines versions 404-1 of the antenna responses between two or more antennas 122 by coupling the feed ports 402-1 of the two or more antennas 122 together. Also, the beamforming circuitry combines versions 404-2 of the antenna responses between the two or more antennas 122 by coupling the feed ports 402-2 of the two or more antennas 122 together. In this manner, each version 404 of the antenna response that is accepted at the interference and clutter cancellation module 124 can correspond to one feed port 402 of an antenna 122 or can correspond to feed ports 402 of multiple antennas 122.

In general, any type of feed port 402 (including the feed ports 410-1, 410-2, 414-1, 414-2, 418-1, or 418-2) may be used to produce the multiple versions 404 if the feed ports 402 are distinct from one another (e.g., sense different phases, polarizations, angles of arrivals, or are otherwise associated with different antennas that are placed at different physical locations). By using multiple feed ports 402, the described techniques for interference and/or clutter cancellation using cross-channel equalization 406 can operate without an extensive calibration process that characterizes a mutual coupling channel, a modulated spur, or environmental clutter. As described in further detail with respect to FIG. 5, some of the components of the wireless transceiver 120 can be utilized for both proximity detection 130 and wireless communication 132.

Figure 5:
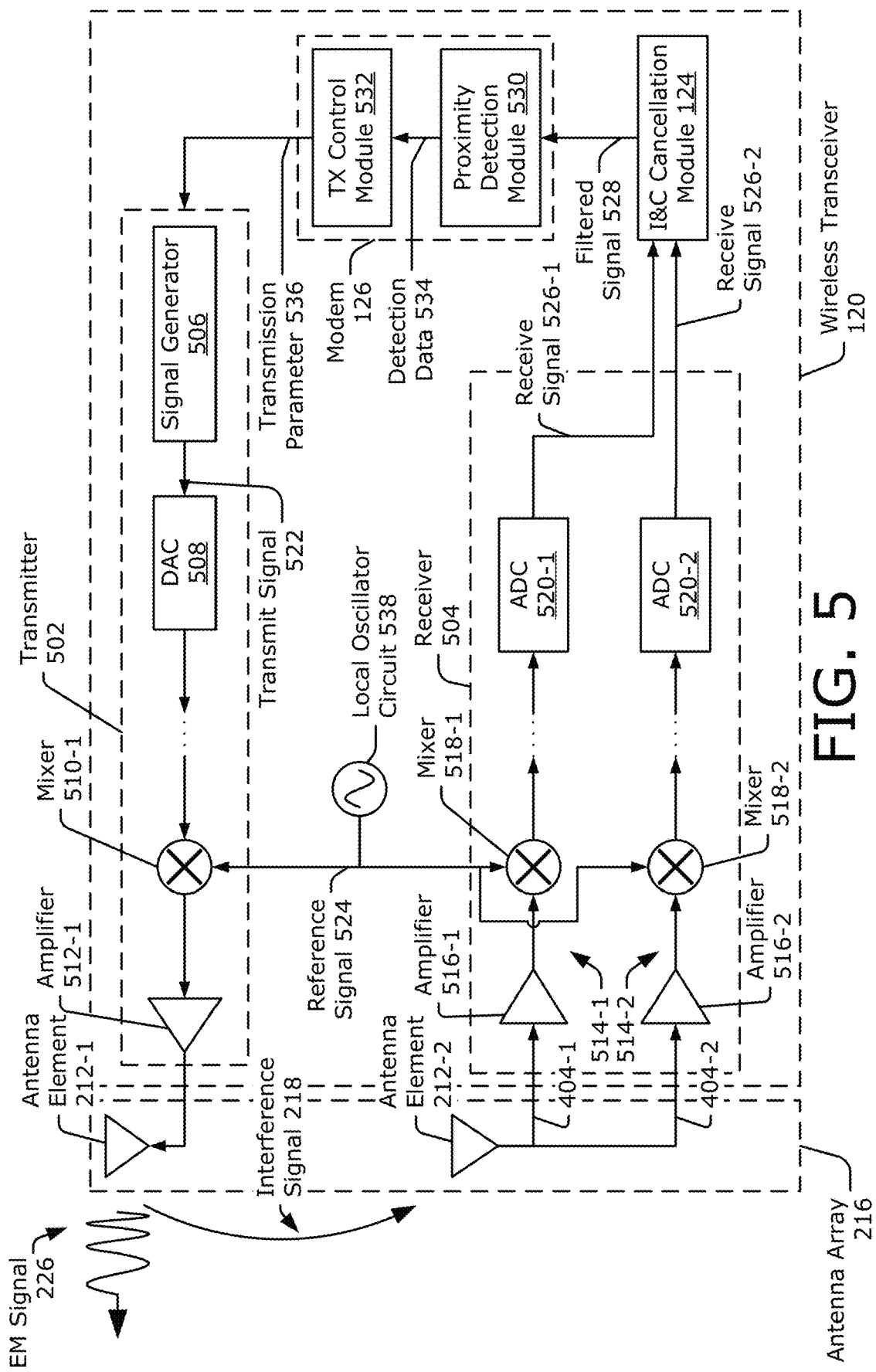
FIG. 5 illustrates examples of a wireless transceiver, an interference and clutter cancellation module, and a modem for interference and/or clutter cancellation using cross-channel equalization.

FIG. 5 illustrates examples of a wireless transceiver 120, an interference and clutter cancellation module 124 (I&C cancellation module 124), and a modem 126. The wireless transceiver 120 can be implemented as a direct-conversion transceiver or a superheterodyne transceiver. In the depicted configuration, the wireless transceiver 120 includes a transmitter 502 and a receiver 504. The transmitter 502 is coupled between the modem 126 and the antenna array 216. The transmitter 502 is shown to include at least one signal generator 506, at least one digital-to-analog converter (DAC) 508, at least one mixer 510-1, and at least one amplifier 512-1 (e.g., a power amplifier). The signal generator 506 can generate a digital signal (e.g., a transmit signal 522), which may be used to derive the electromagnetic signal 226 or the uplink signal 202 (of FIGS. 2 and 3). The signal generator 506 or a portion thereof may be implemented in the modem 126. The transmitter 502 is connected to at least one feed port 402-1 or 402-2 of the antenna element 212-1, such as at least one of the differential feed ports 410 of the dipole antenna 408, at least one of the polarized feed ports 414 of the patch antenna 412, or at least one of the directional feed ports 418 of the bowtie antenna 416, as shown in FIG. 4.

The receiver 504 is coupled between the interference and clutter cancellation module 124 and the antenna array 216. In general, the receiver 504 includes at least two channels 514 (or layers), which are coupled to different feed ports 402 of one or more antenna elements 212. In the depicted configuration, channels 514-1 and 514-2 represent two parallel channels within the receiver 504 that are respectively connected to two feed ports 402-1 and 402-2 (of FIG. 4) of the antenna element 212-2. Although a single antenna element 212-2 is shown to be connected to the two channels 514-1 and 514-2, the channels 514-1 and 514-2 can alternatively be respectively connected to two different antenna elements 212, such as the second antenna element 212-2 and the Nth antenna element 212-N of FIG. 2. The channels 514-1 and 514-2 respectively include at least one amplifier 516-1 and 516-2 (e.g., a low-noise amplifier), at least one mixer 518-1 and 518-2, and analog-to-digital converters (ADC) 520-1 and 520-2. The digital-to-analog converter 508 and/or the analog-to-digital converters 520 may be implemented in the modem 126, or may be implemented in the wireless transceiver 120.

The wireless transceiver 120 also includes a local oscillator circuit 538, which generates a reference signal 524. The reference signal 524 enables the mixers 510-1, 518-1, and 518-2 to upconvert or downconvert analog signals within the transmitter 502 and the receiver 504. The reference signal 524 can have a continuous tone or can be modulated in frequency, as further described with respect to FIG. 6. During operation, the local oscillator circuit 538 provides an appropriate version of the reference signal 524 to support proximity detection 130 or wireless communication 132. The transmitter 502 and the receiver 504 can also include other additional components that are not depicted in FIG. 5 such as filters (e.g., low-pass filters or band-pass filters), phase shifters, additional mixers, switches, and so forth.

During wireless communication 132, the wireless transceiver 120 can transmit the uplink signal 202 or receive the downlink signal 204 (of FIGS. 2 and 3). In particular, the signal generator 506 generates the transmit signal 522, which includes communication data. The digital-to-analog converter 508 converts the transmit signal 522 from the digital domain to the analog domain. The local oscillator circuit 538 generates the reference signal 524 having a steady (e.g., constant) frequency. The mixer 510-1 upconverts the transmit signal 522 to radio frequencies using the reference signal 524. The amplifier 512-1 amplifies the transmit signal 522, and the antenna element 212-1 transmits the transmit signal 522 as the uplink signal 202.

During wireless communication 132, the antenna element 212-2 can receive the downlink signal 204. At least one of the receive channels within the receiver 504 processes the downlink signal 204. For example, the amplifier 516-1 amplifies the downlink signal 204, and the mixer 518-1 downconverts the downlink signal 204 using the reference signal 524, which is the local oscillator signal. The analog-to-digital converter 520-1 converts the downlink signal 204 from the analog domain to the digital domain. The digital version of the downlink signal 204 can be passed to the modem 126 or a data processor in the modem for further processing. The interference and clutter cancellation module 124 can be bypassed during wireless communication 132.

During proximity detection 130, the transmitter 502 transmits the electromagnetic signal 226 via the antenna element 212-1. In particular, the signal generator 506 can generate the transmit signal 522, which can include a single continuous tone. The digital-to-analog converter 508 converts the transmit signal 522 from the digital domain to the analog domain. The local oscillator circuit 538 generates the reference signal 524, which is modulated in frequency. The mixer 510-1 upconverts and modulates the transmit signal 522 using the reference signal 524. The amplifier 512-1 amplifies the upconverted and modulated transmit signal 522, and the antenna element 212-1 transmits the amplified, upconverted, and modulated transmit signal 522 as the electromagnetic signal 226.

The receiver 504 receives different versions 404 of the antenna responses via the antenna element 212-2. The response of the antenna element 212-2 is separated into the versions 404-1 and 404-2 via the feed ports 402-1 and 402-2. Using the mixers 518-1 and 518-2, the channels 514-1 and 514-2 of the receiver 504 demodulate the versions 404-1 and 404-2 of the antenna response using the reference signal 524 and produce receive signals 526-1 and 526-2, respectively, which may be converted into digital version of the signals 526-1 and 526-2 using the ADCs 520-1 and 520-2.

The receive signals 526-1 and 526-2 can have one or more signal components or characteristics that are indicative of a presence of the object 206 and/or range to the object 206. The interference and clutter cancellation module 124 attenuates the interference signal 218 within one of the receive signals 526-1 and 526-2 to generate a filtered signal 528. In particular, the interference and clutter cancellation module 124 uses cross-channel equalization 406 to equalize the slow time-varying components of the interference signal 218 across the receive signals 526-1 and 526-2. After equalization, the interference and clutter cancellation module 124 uses one of the equalized receive signals to cancel the slow time-varying component and fast time-varying component within the other equalized receive signal. By attenuating the interference signal 218, the interference and clutter cancellation module 124 can prevent false detections and enable the signal component or characteristic associated with the object 206 to be detected. In this way, the filtered signal 528 substantially includes information representative of the object 206 (if present) and omits or filters the mutual-coupling component 220, the modulated spur 222, and/or the clutter component 224 associated with the interference signal 218.

In FIG. 5, the modem 126 includes at least one proximity detection module 530 and at least one transmitter control module 532 (TX control module 532). The proximity detection module 530 obtains the filtered signal 528 and generates detection data 534, which indicates whether or not the object 206 is detected. The detection data 534 can include a range to the object 206.

Based on the detection data 534, the transmitter control module 532 generates at least one transmission parameter 536 that controls one or more transmission attributes for wireless communication 132. The transmission parameter 536 can specify one or more transmission-related aspects of the uplink signal 202, such as a power level, polarization, frequency, duration, beam shape, beam steering angle, a selected antenna that transmits the uplink signal 202 (e.g., another antenna that is on a different surface of the computing device 102 and is not obstructed by the object 206), or combinations thereof. Some transmission parameters 536 may be associated with beam management, such as those that define an unobstructed volume of space for beam sweeping. By specifying the transmission parameter 536, the modem 126 can, for example, cause the transmitter 502 to decrease power if an object 206 is close to the computing device 102 or increase power if the object 206 is at a farther range or is not detectable. The ability to detect the object 206 and control the transmitter 502 enables the modem 126 to balance the performance of the computing device 102 with regulatory compliance guidelines. In other implementations, the application processor 108 can perform one or more of these functions.

Although not explicitly shown, multiple antennas 122 (or multiple antenna elements 212) can be used to generate additional versions 404 of the antenna response (e.g., a third version or a fourth version) and provide additional receive signals 526 to the interference and clutter cancellation module 124 (e.g., a third receive signal 526 or a fourth receive signal 526). For example, two or more patch antennas 412 may be used to generate the antenna responses. With multiple filtered signals 528, the computing device 102 can increase a probability of detecting the object 206 (or accurately determining a range thereof) or decrease a probability of false alarms. The transmitter control module 532 can also make different adjustments based on which antennas 122 or what quantity of antennas 122 detect the object 206. In some cases, these adjustments may impact beam management by focusing available beams or targeting a spatial area for beam determination.

For example, in some situations, the object 206 may be closer to one of the antennas 122 than another, which enables the one antenna 122 to detect the object 206 while the other antenna 122 is unable to detect the object 206. In this case, the transmitter control module 532 can decrease a transmit power of the antenna 122 that detected the object 206 relative to the other antenna 122. In some implementations, the multiple antennas 122 can be used to further characterize the relationship between the object 206 and the antennas 122, such as by using triangulation or digital beamforming to estimate an angle to the object 206. In this way, the transmitter control module 532 can adjust the transmission parameter 536 to steer the uplink signal 202 away from the object 206. In general, the interference and clutter cancellation module 124 can provide interference and/or clutter cancellation between any two or more receive signals 526. Components of the local oscillator circuit 538 that enable the wireless transceiver 120 to selectively perform proximity detection 130 and wireless communication 132 are further described with respect to FIG. 6.

Figure 6:
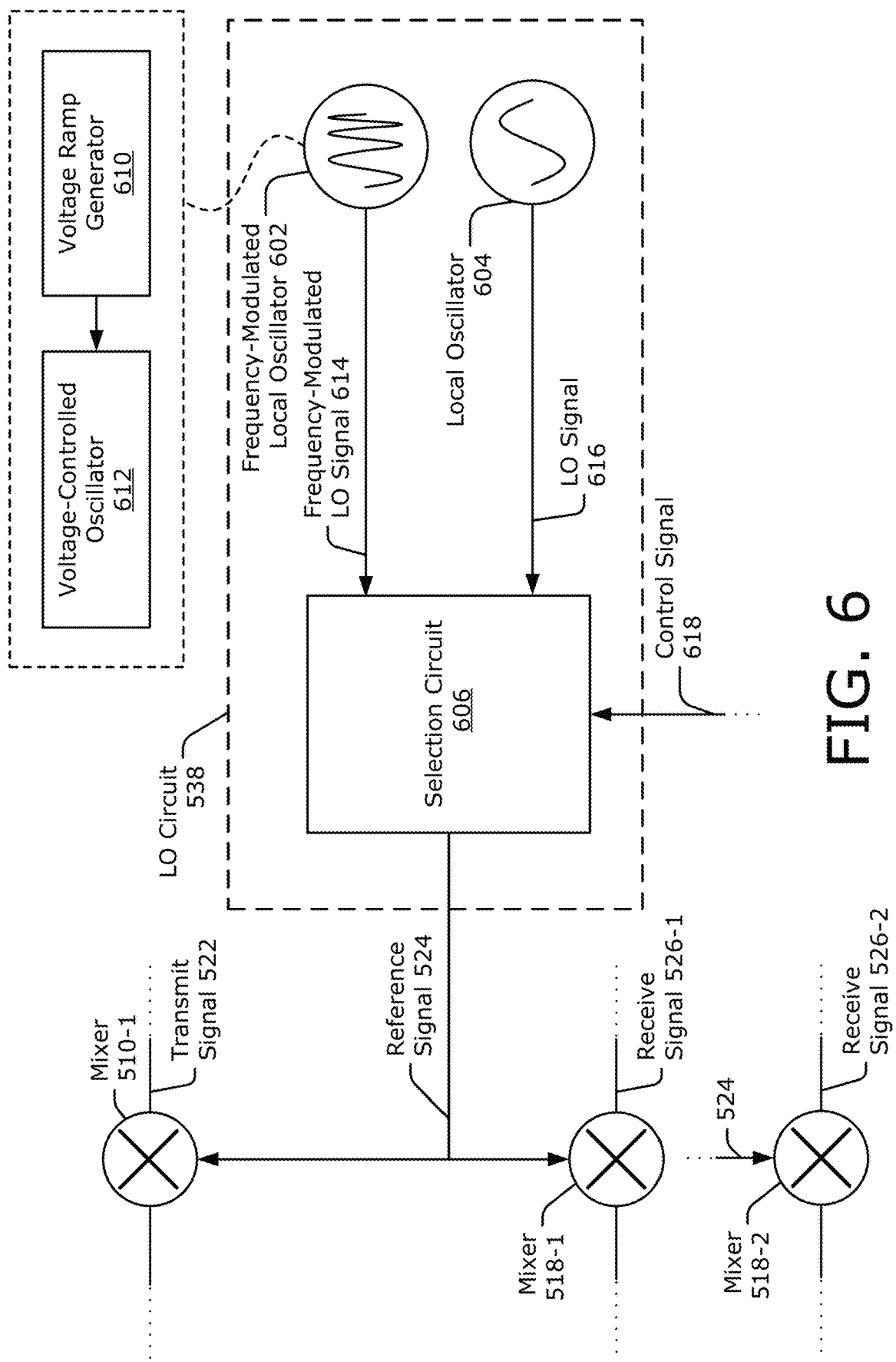
FIG. 6 illustrates an example local oscillator circuit for supporting proximity detection and wireless communication.

FIG. 6 illustrates an example local oscillator circuit 538 (LO circuit 538) for supporting proximity detection 130 and wireless communication 132. In the depicted configuration, the local oscillator circuit 538 includes a frequency-modulated local oscillator 602, a local oscillator 604, and a selection circuit 606. The frequency-modulated local oscillator 602 can be implemented using a voltage ramp generator 610 and a voltage-controlled oscillator 612. As an example, the voltage-controlled oscillator 612 can be implemented using a wideband open-loop voltage-controlled oscillator. By controlling an input voltage to the voltage-controlled oscillator 612, the voltage ramp generator 610 can provide a variety of different voltage ramps to enable the voltage-controlled oscillator 612 to generate a variety of different frequency-modulated local oscillator signals 614 (e.g., a linear-frequency modulated (LFM) signal, a sawtooth-frequency modulated signal, a triangular-frequency modulated signal, and so forth).

The local oscillator 604 can include, for example, a quartz crystal, an inductor-capacitor (LC) oscillator, an oscillator transistor (e.g., a metal-oxide semiconductor field-effective transistor (MOSFET)), a transmission line, a diode, a piezoelectric oscillator, and so forth. A configuration of the local oscillator 604 can enable a target phase noise and quality factor to be achieved for wireless communication 132. In general, the local oscillator 604 generates a local oscillator signal 616 (LO signal 616) with a steady (e.g., constant) frequency. Although not explicitly shown, the local oscillator circuit 538 can also include a phase lock loop or automatic gain control circuit. Either of these components can be coupled to the local oscillator 604 to enable the local oscillator 604 to oscillate at a (e.g., selectable) steady frequency.

The selection circuit 606 can include a switch or a multiplexer that is controlled by the modem 126 via a control signal 618. Based on the control signal 618, the selection circuit 606 connects or disconnects the frequency-modulated local oscillator 602 or the local oscillator 604 to or from the mixers 510-1, 518-1, and 518-2. If the control signal 618 is indicative of the wireless transceiver 120 performing proximity detection 130, the selection circuit 606 connects the frequency-modulated local oscillator 602 to the mixers 510-1, 518-1, and 518-2 to provide the frequency-modulated local oscillator signal 614 as the reference signal 524. Alternatively, if the control signal 618 is indicative of the wireless transceiver 120 performing wireless communication 132, the selection circuit 606 connects the local oscillator 604 to the mixers 510-1, 518-1, and 518-2 to provide the local oscillator signal 616 as the reference signal 524. The selection circuit 606 enables the wireless transceiver 120 to quickly transition between performing operations for proximity detection 130 or wireless communication 132.

Although the frequency-modulated local oscillator 602 and the selection circuit 606 are shown in FIG. 6, other implementations of the local oscillator circuit 538 may not include these components. In this case, the local oscillator 604 can provide the local oscillator signal 616 as the reference signal 524 for both proximity detection 130 and wireless communication 132. In this case, the signal generator 506 can apply a frequency modulation to the transmit signal 522 to enable proximity detection 130. In other examples, respective local oscillator circuitry for wireless communication 132 and proximity detection 130 are implemented, and respective reference signals 524 are provided to the mixers 510-1, 518-1, and 518-2 shared for wireless communication 132 and proximity detection 130 or to respective mixers. Operations of the cross-channel equalizer 128 are further described with respect to FIGS. 7 and 8.

Figure 7:
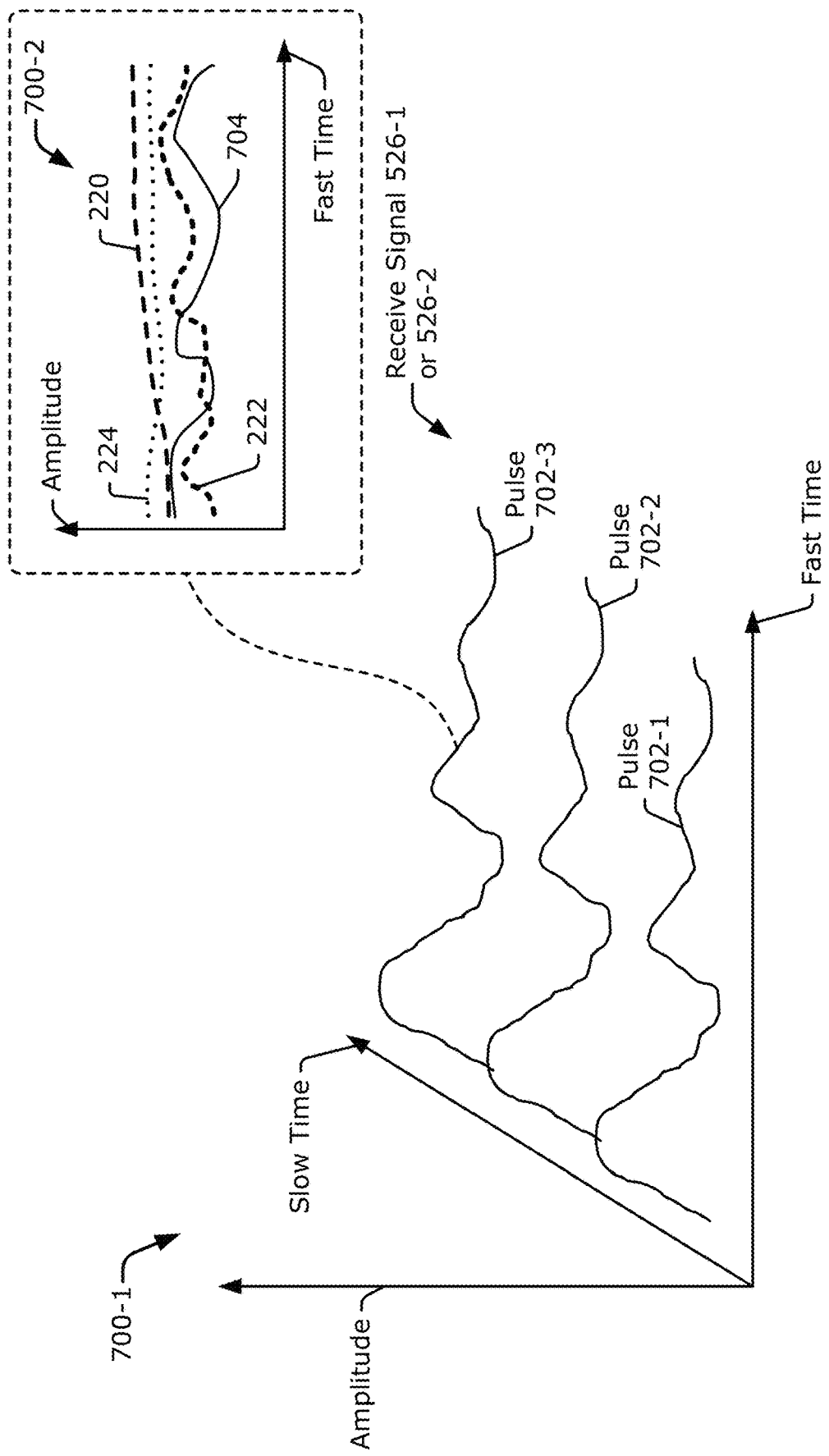
FIG. 7 illustrates an example plot of a receive signal for interference and clutter cancellation using cross-channel equalization.

FIG. 7 illustrates an example plot 700-1 of an amplitude of the receive signal 526-1 or 526-2 across fast time and slow time. A duration of the receive signal 526-1 or 526-2 across the fast time corresponds to a duration of each pulse 702 within the receive signal 526-1 or 526-2. A duration of the receive signal 526-1 or 526-2 across slow time represents an inter-pulse period (IPP) of the receive signal 526-1 or 526-2 (e.g., a duration between successive pulses of the electromagnetic signal 226). For simplicity, the receive signal 526-1 or 526-2 is shown to include three pulses 702-1, 702-2, and 702-3 in FIG. 7. The receive signal 526-1 or 526-2, however, can include any quantity of pulses 702.

The amplitude (and phase) of each pulse 702 represents a summation of the receive signal 526-1 or 526-2 and the interference signal 218. As described with respect to FIG. 3, the interference signal 218 can include the mutual-coupling component 220, the modulated spur 222, the clutter component 224, or some combination thereof. These component signals are illustrated in plot 700-2 for one of the pulses 702-1 to 702-3. As seen in the plot 700-2, the mutual-coupling component 220 and the clutter component 224 represent slow time-varying components (or slow time-varying component signals). The amplitude and phase of the slow time-varying components do not change frequently over the duration of the pulse 702. As such, the frequency of the slow time-varying components can be close to a baseband frequency. In contrast, an object-based signal component 704, which represents the perturbation 210 associated with the near field or the radar receive signal associated with the far field, and the modulated spur 222 represent fast time-varying components (or fast time-varying component signals). The amplitude and/or phase of fast time-varying components can change frequently over the duration of a pulse 702. The frequency of the fast time-varying components can be closer to the beat frequency compared to the baseband frequency.

In general, the object-based signal component 704 is uncorrelated between the two channels 514 due to random fluctuations in magnitude and/or phase caused by the object 206. The object-based signal component 704 is also uncorrelated to the slow time-varying components. Components of the interference signal 218, however, can be correlated between the two channels 514 within each pulse 702 of the receive signal 526-1 or 526-2. The components of the interference signal 218 may be uncorrelated over successive pulses 702. The mutual-coupling component 220 and the modulated spur 222 are co-linear because of their relationship to a same transmitter 502. Also, the mutual-coupling component 220 and the modulated spur 222 are similar across the channels 514 within a scale factor, which may be a complex scale factor. To attenuate the interference signal 218, the interference and clutter cancellation module 124 uses cross-channel equalization 406, which is further described with respect to FIG. 8.

Figure 8:
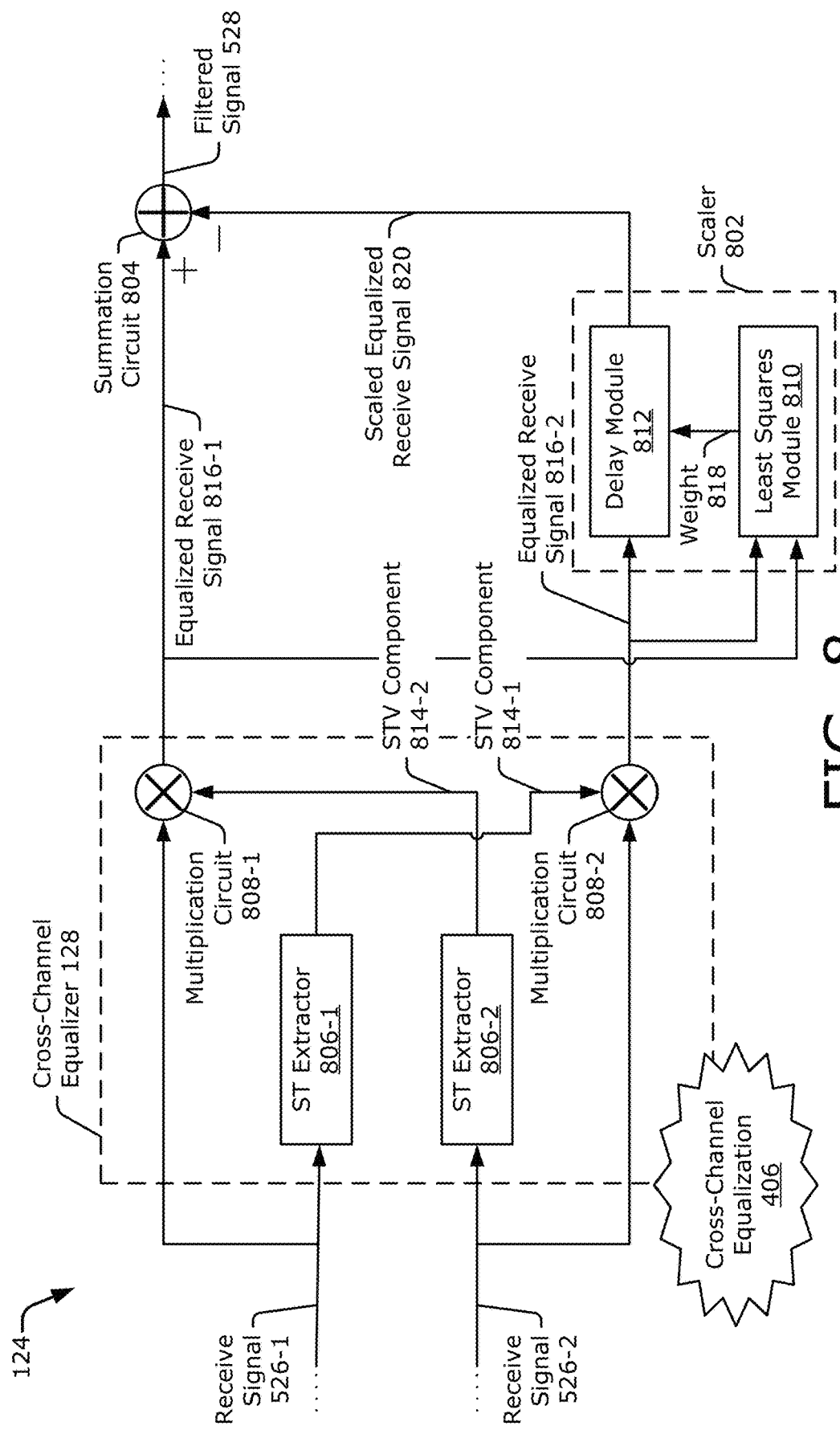
FIG. 8 illustrates an example implementation of an interference and clutter cancellation module for interference and/or clutter cancellation using cross-channel equalization.

FIG. 8 illustrates an example implementation of the interference and clutter cancellation module 124. In the depicted configuration, the interference and clutter cancellation module 124 includes the cross-channel equalizer 128, an optional scaler 802, and a summation circuit 804. The cross-channel equalizer 128 is coupled to at least two channels 514 of the receiver 504, the scaler 802, and the summation circuit 804. During operation, the cross-channel equalizer 128 performs aspects of cross-channel equalization 406.

The cross-channel equalizer 128 includes at least two slow-time extractors 806, such as slow-time extractors 806-1 and 806-2 (ST extractors 806-1 and 806-2). The cross-channel equalizer 128 also includes at least two multiplication circuits 808, such as multiplication circuits 808-1 and 808-2. The slow-time extractors 806-1 and 806-2 track and extract the slow time-varying components of the interference signal 218 (e.g., the mutual-coupling component 220 and/or the clutter component 224). The slow-time extractors 806-1 and 806-2 can be implemented using, for example, an infinite-impulse-response (IIR) low-pass filter.

The scaler 802 determines and applies a scaling factor to enable one of the receive signals 526 to cancel slow time-varying components and correlated fast time-varying components within another one of the receive signals 526. The scaling factor can have a magnitude component and/or a phase component. In an example implementation, the scaler 802 includes a least-squares module 810 and a delay module 812.

During proximity detection 130, the cross-channel equalizer 128 accepts at least two receive signals 526, such as receive signals 526-1 and 526-2. The slow-time extractor 806-1 extracts a first slow time-varying component 814-1 (STV component 814-1) from the receive signal 526-1. Similarly, the slow-time extractor 806-2 extracts a second slow time-varying component 814-2 (STV component 814-2) from the receive signal 526-2. The slow time-varying components 814-1 and 814-2 can each include the mutual-coupling component 220 and/or the clutter component 224.

The cross-channel equalizer 128 equalizes (or makes similar) the slow time-varying components 814 within the receive signals 526. In particular, the cross-channel equalizer 128 applies the slow time-varying component associated with one channel to the receive signal 526 associated with another channel. For example, the multiplication circuit 808-1 generates a first equalized receive signal 816-1 by multiplying the receive signal 526-1 with the second slow time-varying component 814-2. Also, the multiplication circuit 808-2 generates a second equalized receive signal 816-2 by multiplying the receive signal 526-2 with the first slow time-varying component 814-1.

The scaler 802 uses the least-squares module 810 and the equalized receive signals 816-1 and 816-2 to produce at least one weight 818 for scaling the equalized receive signal 816-2. The scaler 802 generates a scaled equalized receive signal 820 by aligning and applying the weights 818 to the equalized receive signal 816-2 using the delay module 812. Due to the cross-channel equalization 406 and the scaling, the scaled equalized receive signal 820 includes slow time-varying components and fast time-varying components with substantially similar amplitudes and phases as the slow time-varying components and the fast time-varying components within the equalized receive signal 816-1.

The summation circuit 804 combines the equalized receive signal 816-1 and the scaled equalized receive signal 820 together in a way that attenuates the interference signal 218. In the depicted configuration, the summation circuit 804 subtracts the scaled equalized receive signal 820 from the equalized receive signal 816-1 to generate the filtered signal 528, but the equalized receive signal 816-1 may be scaled and subtracted from the equalized receive signal 816-2 in other implementations. In this way, the slow time-varying components and fast time-varying components associated with the interference signal 218 are attenuated within the filtered signal 528 without meaningfully attenuating the object-based signal component 704.

With cross-channel equalization 406, the interference signal 218 is attenuated by a sufficient amount such that the computing device 102 does not detect or determine the mutual-coupling component 220, the modulated spur 222, and/or the clutter component 224 to be an object of interest. In some implementations, the magnitude of the mutual-coupling component 220, the modulated spur 222, and/or the clutter component 224 is less than a detection threshold and causes the computing device 102 to determine that these components are not associated with an object of interest. At the same time, the magnitude of the object-based signal component 704 is above the detection threshold and causes the computing device 102 to detect the one or more objects 206 that caused the object-based signal component 704. This cancellation enables detection of weak signal components within the filtered signal 528 to be processed for proximity detection 130 and enables the computing device 102 to realize a target false-alarm rate performance.

The techniques for interference and clutter cancellation using cross-channel equalization 406 can be applied to more than two receive signals 526 (or more than two receive channels). For example, the interference and clutter cancellation module 124 can perform similar operations using a third and fourth receive signal 526.

Although described with respect to proximity detection 130, the techniques of implementing interference and/or clutter cancellation using cross-channel equalization can also be applied in other wireless applications, including those that utilize full-duplex operation in which transmission and reception occur during a same time interval.

FIG. 9 is a flow diagram illustrating an example process 900 for interference and/or clutter cancellation using cross-channel equalization. The process 900 is described in the form of a set of blocks 902-906 that specify operations that can be performed. However, operations are not necessarily limited to the order shown in FIG. 9 or described herein, for the operations may be implemented in alternative orders or in fully or partially overlapping manners. Operations represented by the illustrated blocks of the process 900 may be performed by a wireless transceiver 120 (e.g., of FIG. 1 or 5). More specifically, the operations of the process 900 may be performed, in part, by an interference and clutter cancellation module 124 of FIGS. 1 and 8.

At block 902, an electromagnetic signal is transmitted using a first feed port of multiple feed ports. A modulated spur is generated based on the transmission of the electromagnetic signal. For example, the computing device 102 transmits the electromagnetic signal 226 using a first feed port 402 of multiple feed ports 402, as shown in FIGS. 2-1 and 4. The modulated spur 222 is generated based on the transmission of the electromagnetic signal 226. The modulated spur 222 represents a fast time-varying component. The electromagnetic signal 226 produces the electromagnetic field 208 in a near field and the radar transmit signal in a far field.

At block 904, two versions of a receive signal are respectively received via two feed ports of the multiple feed ports. The receive signal comprises a mutual-coupling component associated with the modulated spur and the transmission of the electromagnetic signal. For example, the computing device 102 receives two versions of the receive signal 404-1 and 404-2 using two feed ports 402-1 and 402-2 of the multiple feed ports 402, as shown in FIGS. 4 and 5. The receive signal comprises a component corresponding to a mutual-coupling component 220 associated with the modulated spur 222 and the transmission of the electromagnetic signal 226. The mutual-coupling component 220 represents a type of slow time-varying component. The receive signal can also include a clutter component 224, which represents another type of slow time-varying component. If an object 206 is present, the receive signal can further include the object-based signal component 704.

At block 906, a filtered signal is generated by attenuating the mutual-coupling component and the modulated spur within one of the two versions of the receive signal using cross-channel equalization. For example, the interference and clutter cancellation module 124 generates the filtered signal 528 by attenuating the mutual-coupling component 220 and the modulated spur 222 within one of the two versions of the receive signal 404-1 or 404-2 using cross-channel equalization 406, as described with respect to FIG. 8. Cross-channel equalization 406 involves equalizing magnitudes of the slow time-varying components of the interference signal 218 across the receive signals 526-1 and 526-2 and using one of the equalized receive signals 816 to attenuate the slow time-varying component and/or the correlated fast time-varying component within the other equalized receive signal 816.

Some aspects are described below.

Aspect 1: An apparatus comprising:
a wireless transceiver configured to:
  be connected to multiple feed ports;
  transmit an electromagnetic signal using a first feed port of the multiple feed ports, a modulated spur generated based on the transmission of the electromagnetic signal;
  receive two versions of a receive signal respectively via two feed ports of the multiple feed ports, the receive signal comprising the modulated spur and a mutual-coupling component associated with the transmission of the electromagnetic signal; and
  generate a filtered signal by attenuating the mutual-coupling component and the modulated spur within one of the two versions of the receive signal using cross-channel equalization.

Aspect 2: The apparatus of aspect 1, wherein:
the receive signal comprises a clutter component; and
the wireless transceiver is configured to generate the filtered signal by attenuating the mutual-coupling component, the modulated spur, and the clutter component within the one of the two versions of the receive signal using the cross-channel equalization.

Aspect 3: The apparatus of aspect 1 or 2, wherein the wireless transceiver is configured to:
generate two equalized receive signals by equalizing the mutual-coupling component within the two versions of the receive signal; and
combine the two equalized receive signals to generate the filtered signal.

Aspect 4: The apparatus of aspect 3, wherein:
the two versions of the receive signal comprise a first receive signal and a second receive signal; and
the wireless transceiver is configured to:
  extract a first mutual-coupling component from the first receive signal;
  extract a second mutual-coupling component from the second receive signal;
  generate a first equalized receive signal by multiplying the first receive signal by the second mutual-coupling component; and generate a second equalized receive signal by multiplying the second receive signal by the first mutual-coupling component.

Aspect 5: The apparatus of aspect 4, wherein the wireless transceiver is configured to:

generate a scaled equalized receive signal by applying a scale factor to the second equalized receive signal; and generate the filtered signal by subtracting the scaled equalized receive signal from the first equalized receive signal.

Aspect 6: The apparatus of any previous aspect, wherein the mutual coupling component has a magnitude or phase that varies across successive pulses of the electromagnetic signal but that remains relatively constant across an individual pulse of the electromagnetic signal.

Aspect 7: The apparatus of any previous aspect, wherein the modulated spur has a magnitude or phase that varies across one pulse of the electromagnetic signal.

Aspect 8: The apparatus of any previous aspect, wherein the two feed ports of the multiple feed ports are associated with a same antenna.

Aspect 9: The apparatus of any one of aspects 1 to 7, wherein the two feed ports of the multiple feed ports are associated with different polarizations.

Aspect 10: The apparatus of any previous aspect, wherein the two feed ports of the multiple feed ports are associated with different antennas.

Aspect 11: The apparatus of any previous aspect, wherein the wireless transceiver is configured to adjust a transmission parameter based on the filtered signal, the transmission parameter varying based on detection of an object.

Aspect 12: The apparatus of any previous aspect, wherein the wireless transceiver comprises a modem configured to generate the filtered signal.

Aspect 13: An apparatus comprising:

means for transmitting an electromagnetic signal using a first feed port of multiple feed ports, a modulated spur generated based on the transmission of the electromagnetic signal;

means for receiving two versions of a receive signal respectively via two feed ports of the multiple feed ports, the receive signal comprising the modulated spur and a mutual-coupling component associated with the transmission of the electromagnetic signal; and means for generating a filtered signal by attenuating the mutual-coupling component and the modulated spur within one of the two versions of the receive signal using cross-channel equalization.

Aspect 14: The apparatus of aspect 13, wherein:

the receive signal comprises a clutter component; and the means for generating the filtered signal is configured to attenuate the mutual-coupling component, the modulated spur, and the clutter component within the one of the two versions of the receive signal using the cross-channel equalization.

Aspect 15: The apparatus of aspect 13 or 14, wherein the means for generating the filtered signal comprises:

means for generating two equalized receive signals by equalizing the mutual-coupling component within the two versions of the receive signal; and means for combining the two equalized receive signals to generate the filtered signal.

Aspect 16: The apparatus of aspect 15, wherein:

the two versions of the receive signal comprise a first receive signal and a second receive signal; and the means for generating the two equalized receive signals comprises:

means for extracting a first mutual-coupling component from the first receive signal;

means for extracting a second mutual-coupling component from the second receive signal;

means for generating a first equalized receive signal by multiplying the first receive signal by the second mutual-coupling component; and means for generating a second equalized receive signal by multiplying the second receive signal by the first mutual-coupling component.

Aspect 17: The apparatus of aspect 16, wherein the means for generating the filtered signal comprises:

means for generating a scaled equalized receive signal by applying a scale factor to the second equalized receive signal; and means for subtracting the scaled equalized receive signal from the first equalized receive signal.

Aspect 18: A method comprising:

transmitting an electromagnetic signal using a first feed port of multiple feed ports, a modulated spur generated based on the transmission of the electromagnetic signal;

receiving two versions of a receive signal respectively via two feed ports of the multiple feed ports, the receive signal comprising the modulated spur and a mutual-coupling component associated with the transmission of the electromagnetic signal; and generating a filtered signal by attenuating the mutual-coupling component and the modulated spur within one of the two versions of the receive signal using cross-channel equalization.

Aspect 19: The method of aspect 18, wherein:

the receive signal comprises a clutter component; and the generating of the filtered signal comprises attenuating the mutual-coupling component, the modulated spur, and the clutter component within the one of the two versions of the receive signal using the cross-channel equalization.

Aspect 20: The method of aspect 18 or 19, wherein the generating of the filtered signal comprises:

generating two equalized receive signals by equalizing the mutual-coupling component within the two versions of the receive signal; and combining the two equalized receive signals to generate the filtered signal.

Aspect 21: The method of aspect 20, wherein:

the two versions of the receive signal comprise a first receive signal and a second receive signal; and the generating of the two equalized receive signals comprises:

extracting a first mutual-coupling component from the first receive signal;

extracting a second mutual-coupling component from the second receive signal;

generating a first equalized receive signal by multiplying the first receive signal by the second mutual-coupling component; and generating a second equalized receive signal by multiplying the second receive signal by the first mutual-coupling component.

Aspect 22: The method of aspect 21, further comprising:

generating a scaled equalized receive signal by applying a scale factor to the second equalized receive signal, wherein the generating of the filtered signal comprises generating the filtered signal by subtracting the scaled equalized receive signal from the first equalized receive signal.

Aspect 23: An apparatus comprising:

a wireless transceiver configured to:
  be connected to multiple feed ports;
  transmit an electromagnetic signal using a first feed port of the multiple feed ports, a modulated spur generated based on the transmission of the electromagnetic signal, the modulated spur comprising a fast time-varying component having a magnitude or phase that varies substantially within a duration of a pulse of the electromagnetic signal;
  receive two versions of a receive signal respectively via two feed ports of the multiple feed ports, the receive signal comprising the modulated spur;
  detect at least one object based on the receive signal; and
  satisfy a target false-alarm rate in the presence of the modulated spur.

Aspect 24: The apparatus of aspect 23, wherein the wireless transceiver is configured to:

generate an electromagnetic field within a near field based on the transmission of the electromagnetic signal; and detect at least one object within the near field based on a perturbation in the electromagnetic field.

Aspect 25: The apparatus of claim 23, wherein the wireless transceiver is configured to:

generate a radar transmit signal within a far field based on the transmission of the electromagnetic signal; and detect at least one object within the far field based on a reflection version of the radar transmit signal.

Aspect 26: The apparatus of any one of aspects 23 to 25, wherein:

the magnitude or phase of the fast time-varying component has a median value within the duration of the pulse of the electromagnetic signal; and the magnitude or phase of the fast time-varying component varies by at least 5% from the median value within the duration of the pulse of the electromagnetic signal.

Aspect 27: The apparatus of any one of aspects 23 to 26, wherein the wireless transceiver is configured to attenuate the fast time-varying component within one of the two versions of the receive signal by using cross-channel equalization.

Aspect 28: The apparatus of aspect 27, wherein a magnitude of the attenuated fast time-varying component is less than a detection threshold.

Aspect 29: The apparatus of aspect 27 or 28, wherein: the receive signal comprises a slow time-varying component having a magnitude or phase that varies across multiple pulses associated with the electromagnetic signal but does not substantially vary across an individual pulse associated with the electromagnetic signal; and the wireless transceiver is configured to attenuate the slow time-varying component within the one of the two versions of the receive signal based, at least in part, on using the cross-channel equalization.

Aspect 30: The apparatus of aspect 29, wherein the slow time-varying component comprises a mutual-coupling component or a clutter component.

Unless context dictates otherwise, use herein of the word "or" may be considered use of an "inclusive or," or a term that permits inclusion or application of one or more items that are linked by the word "or" (e.g., a phrase "A or B" may be interpreted as permitting just "A," as permitting just "B," or as permitting both "A" and "B"). As used herein, a phrase referring to "at least one of" a list of items refers to any combination of those items, including single members. As an example, "at least one of: a, b, or c" is intended to cover: a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c). Further, items represented in the accompanying figures and terms discussed herein may be indicative of one or more items or terms, and thus reference may be made interchangeably to single or plural forms of the items and terms in this written description. Finally, although subject matter has been described in language specific to structural features or methodological operations, it is to be understood that the subject matter defined in the appended claims is not necessarily limited to the specific features or operations described above, including not necessarily being limited to the organizations in which features are arranged or the orders in which operations are performed.

What is claimed is:

1. An apparatus comprising:
a wireless transceiver configured to:
  be connected to multiple feed ports;
  transmit an electromagnetic signal using a first feed port of the multiple feed ports, a modulated spur generated based on the transmission of the electromagnetic signal;
  receive two versions of a receive signal respectively via two feed ports of the multiple feed ports, the receive signal comprising the modulated spur and a mutual-coupling component associated with the transmission of the electromagnetic signal; and
  generate a filtered signal by attenuating the mutual-coupling component and the modulated spur within one of the two versions of the receive signal using cross-channel equalization.

2. The apparatus of claim 1, wherein:
the receive signal comprises a clutter component; and
the wireless transceiver is configured to generate the filtered signal by attenuating the mutual-coupling component, the modulated spur, and the clutter component within the one of the two versions of the receive signal using the cross-channel equalization.

3. The apparatus of claim 1, wherein the wireless transceiver is configured to:
generate two equalized receive signals by equalizing the mutual-coupling component within the two versions of the receive signal; and
combine the two equalized receive signals to generate the filtered signal.

4. The apparatus of claim 3, wherein:
the two versions of the receive signal comprise a first receive signal and a second receive signal; and
the wireless transceiver is configured to:
  extract a first mutual-coupling component from the first receive signal;
  extract a second mutual-coupling component from the second receive signal;
  generate a first equalized receive signal by multiplying the first receive signal by the second mutual-coupling component; and
  generate a second equalized receive signal by multiplying the second receive signal by the first mutual-coupling component.

5. The apparatus of claim 4, wherein the wireless transceiver is configured to:
generate a scaled equalized receive signal by applying a scale factor to the second equalized receive signal; and
generate the filtered signal by subtracting the scaled equalized receive signal from the first equalized receive signal.

6. The apparatus of claim 1, wherein the mutual-coupling component has a magnitude or phase that varies across successive pulses of the electromagnetic signal but that remains relatively constant across an individual pulse of the electromagnetic signal.

7. The apparatus of claim 1, wherein the modulated spur has a magnitude or phase that varies across one pulse of the electromagnetic signal.

8. The apparatus of claim 1, wherein the two feed ports of the multiple feed ports are associated with a same antenna.

9. The apparatus of claim 1, wherein the two feed ports of the multiple feed ports are associated with different polarizations.

10. The apparatus of claim 1, wherein the two feed ports of the multiple feed ports are associated with different antennas.

11. The apparatus of claim 1, wherein the wireless transceiver is configured to adjust a transmission parameter based on the filtered signal, the transmission parameter varying based on detection of an object.

12. The apparatus of claim 1, wherein the wireless transceiver comprises a modem configured to generate the filtered signal.

13. An apparatus comprising:
means for transmitting an electromagnetic signal using a first feed port of multiple feed ports, a modulated spur generated based on the transmission of the electromagnetic signal;
means for receiving two versions of a receive signal respectively via two feed ports of the multiple feed ports, the receive signal comprising the modulated spur and a mutual-coupling component associated with the transmission of the electromagnetic signal; and
means for generating a filtered signal by attenuating the mutual-coupling component and the modulated spur within one of the two versions of the receive signal using cross-channel equalization.

14. The apparatus of claim 13, wherein:
the receive signal comprises a clutter component; and
the means for generating the filtered signal is configured to attenuate the mutual-coupling component, the modulated spur, and the clutter component within the one of the two versions of the receive signal using the cross-channel equalization.

15. The apparatus of claim 13, wherein the means for generating the filtered signal comprises:
means for generating two equalized receive signals by equalizing the mutual-coupling component within the two versions of the receive signal; and
means for combining the two equalized receive signals to generate the filtered signal.

16. The apparatus of claim 15, wherein:
the two versions of the receive signal comprise a first receive signal and a second receive signal; and
the means for generating the two equalized receive signals comprises:
means for extracting a first mutual-coupling component from the first receive signal;
means for extracting a second mutual-coupling component from the second receive signal;
means for generating a first equalized receive signal by multiplying the first receive signal by the second mutual-coupling component; and
means for generating a second equalized receive signal by multiplying the second receive signal by the first mutual-coupling component.

17. The apparatus of claim 16, wherein the means for generating the filtered signal comprises:
means for generating a scaled equalized receive signal by applying a scale factor to the second equalized receive signal; and
means for subtracting the scaled equalized receive signal from the first equalized receive signal.

18. A method comprising:
transmitting an electromagnetic signal using a first feed port of multiple feed ports, a modulated spur generated based on the transmission of the electromagnetic signal;
receiving two versions of a receive signal respectively via two feed ports of the multiple feed ports, the receive signal comprising the modulated spur and a mutual-coupling component associated with the transmission of the electromagnetic signal; and
generating a filtered signal by attenuating the mutual-coupling component and the modulated spur within one of the two versions of the receive signal using cross-channel equalization.

19. The method of claim 18, wherein:
the receive signal comprises a clutter component; and
the generating of the filtered signal comprises attenuating the mutual-coupling component, the modulated spur, and the clutter component within the one of the two versions of the receive signal using the cross-channel equalization.

20. The method of claim 18, wherein the generating of the filtered signal comprises:
generating two equalized receive signals by equalizing the mutual-coupling component within the two versions of the receive signal; and
combining the two equalized receive signals to generate the filtered signal.

21. The method of claim 20, wherein:
the two versions of the receive signal comprise a first receive signal and a second receive signal; and
the generating of the two equalized receive signals comprises:
extracting a first mutual-coupling component from the first receive signal;
extracting a second mutual-coupling component from the second receive signal;
generating a first equalized receive signal by multiplying the first receive signal by the second mutual-coupling component; and
generating a second equalized receive signal by multiplying the second receive signal by the first mutual-coupling component.

22. The method of claim 21, further comprising:
generating a scaled equalized receive signal by applying a scale factor to the second equalized receive signal,
wherein the generating of the filtered signal comprises generating the filtered signal by subtracting the scaled equalized receive signal from the first equalized receive signal.

23. An apparatus comprising:
a wireless transceiver configured to:
- be connected to multiple feed ports;
- transmit an electromagnetic signal using a first feed port of the multiple feed ports, a modulated spur generated based on the transmission of the electromagnetic signal, the modulated spur comprising a fast time-varying component having a magnitude or phase that varies substantially within a duration of a pulse of the electromagnetic signal;
- receive two versions of a receive signal respectively via two feed ports of the multiple feed ports, the receive signal comprising the modulated spur; and
- satisfy a target false-alarm rate in the presence of the modulated spur.

24. The apparatus of claim 23, wherein the wireless transceiver is configured to:
generate an electromagnetic field within a near field based on the transmission of the electromagnetic signal; and
detect at least one object within the near field based on a perturbation in the electromagnetic field.

25. The apparatus of claim 23, wherein the wireless transceiver is configured to:
generate a radar transmit signal within a far field based on the transmission of the electromagnetic signal; and
detect at least one object within the far field based on a reflection version of the radar transmit signal.

26. The apparatus of claim 23, wherein:
the magnitude or phase of the fast time-varying component has a median value within the duration of the pulse of the electromagnetic signal; and
the magnitude or phase of the fast time-varying component varies by at least 5% from the median value within the duration of the pulse of the electromagnetic signal.

27. The apparatus of claim 23, wherein the wireless transceiver is configured to attenuate the fast time-varying component within one of the two versions of the receive signal by using cross-channel equalization.

28. The apparatus of claim 27, wherein a magnitude of the attenuated fast time-varying component is less than a detection threshold.

29. The apparatus of claim 27, wherein: the receive signal comprises a slow time-varying component having a magnitude or phase that varies across multiple pulses associated with the electromagnetic signal but does not substantially vary across an individual pulse associated with the electromagnetic signal; and
the wireless transceiver is configured to attenuate the slow time-varying component within the one of the two versions of the receive signal based, at least in part, on using the cross-channel equalization.

30. The apparatus of claim 29, wherein the slow time-varying component comprises a mutual-coupling component or a clutter component.

* * * * *